United States Patent
Alperovitch et al.

(10) Patent No.: US 8,763,114 B2
(45) Date of Patent: Jun. 24, 2014

(54) DETECTING IMAGE SPAM

(75) Inventors: Dmitri Alperovitch, Atlanta, GA (US); Nick Black, Atlanta, GA (US); Jeremy Gould, Atlanta, GA (US); Paul Judge, Atlanta, GA (US); Sven Krasser, Atlanta, GA (US); Phyllis Adele Schneck, Atlanta, GA (US); Yuchun Tang, Roswell, GA (US); Aarjav Jyotindra Neeta Trivedi, Atlanta, GA (US); Lamar Lorenzo Willis, Woodstock, GA (US); Weilai Yang, Alpharetta, GA (US); Jonathan Alexander Zdziarski, Milledgeville, GA (US)

(73) Assignee: McAfee, Inc., Santa Clara, CA (US)

( * ) Notice: Subject to any disclaimer, the term of this patent is extended or adjusted under 35 U.S.C. 154(b) by 1310 days.

(21) Appl. No.: 11/626,568

(22) Filed: Jan. 24, 2007

(65) Prior Publication Data
US 2008/0178288 A1    Jul. 24, 2008

(51) Int. Cl.
*G08B 23/00* (2006.01)
*G06K 9/62* (2006.01)
*H04L 29/06* (2006.01)
*G06F 15/16* (2006.01)

(52) U.S. Cl.
CPC ............ *H04L 63/0227* (2013.01); *H04L 63/20* (2013.01)
USPC ............. 726/22; 709/206; 709/207; 709/246; 382/103; 382/209

(58) Field of Classification Search
USPC ............. 726/22; 382/103, 209; 709/206, 207, 709/246
See application file for complete search history.

(56) References Cited

U.S. PATENT DOCUMENTS

| | | |
|---|---|---|
| 4,289,930 A | 9/1981 | Connolly et al. |
| 4,384,325 A | 5/1983 | Slechta et al. |
| 4,386,416 A | 5/1983 | Giltner et al. |
| 4,532,588 A | 7/1985 | Foster |
| 4,713,780 A | 12/1987 | Schultz et al. |
| 4,754,428 A | 6/1988 | Schultz et al. |
| 4,837,798 A | 6/1989 | Cohen et al. |
| 4,853,961 A | 8/1989 | Pastor |
| 4,864,573 A | 9/1989 | Horsten |
| 4,951,196 A | 8/1990 | Jackson |
| 4,975,950 A | 12/1990 | Lentz |
| 4,979,210 A | 12/1990 | Nagata et al. |
| 5,008,814 A | 4/1991 | Mathur |

(Continued)

FOREIGN PATENT DOCUMENTS

| | | |
|---|---|---|
| AU | 2003230606 | 10/2003 |
| AU | 2005304883 | 5/2006 |

(Continued)

OTHER PUBLICATIONS

Kane, Paul J. et al. "Quantification of Banding, Streaking and Grain in Flat Field Images", 2000.*

(Continued)

*Primary Examiner* — Michael Simitoski
(74) *Attorney, Agent, or Firm* — Patent Capital Group

(57) ABSTRACT

Methods and systems for operation upon one or more data processors for detecting image spam by detecting an image and analyzing the content of the image to determine whether the incoming communication comprises an unwanted communication.

40 Claims, 15 Drawing Sheets

(56) References Cited

U.S. PATENT DOCUMENTS

| | | |
|---|---|---|
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,136,690 A | 8/1992 | Becker et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,384,848 A | 1/1995 | Kikuchi |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,586,254 A | 12/1996 | Kondo et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,621,889 A | 4/1997 | Lermuzeaux et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,768,552 A | 6/1998 | Jacoby |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,830 A | 4/1999 | Wesinger et al. |
| 5,898,836 A | 4/1999 | Freivald et al. |
| 5,903,723 A | 5/1999 | Becker et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,987,610 A | 11/1999 | Franczek et al. |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,052,784 A | 4/2000 | Day |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,073,142 A | 6/2000 | Geiger et al. |
| 6,088,804 A | 7/2000 | Hill et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |

(56) References Cited

U.S. PATENT DOCUMENTS

| | | |
|---|---|---|
| 6,108,688 A | 8/2000 | Nielsen |
| 6,108,691 A | 8/2000 | Lee et al. |
| 6,108,786 A | 8/2000 | Knowlson |
| 6,118,856 A | 9/2000 | Paarsmarkt et al. |
| 6,118,886 A * | 9/2000 | Baumgart et al. ............ 382/103 |
| 6,119,137 A | 9/2000 | Smith et al. |
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |
| 6,141,778 A | 10/2000 | Kane et al. |
| 6,145,083 A | 11/2000 | Shaffer et al. |
| 6,151,675 A | 11/2000 | Smith |
| 6,161,130 A | 12/2000 | Horvitz et al. |
| 6,165,314 A | 12/2000 | Gardner et al. |
| 6,185,314 B1 * | 2/2001 | Crabtree et al. ............. 382/103 |
| 6,185,680 B1 | 2/2001 | Shimbo et al. |
| 6,185,689 B1 | 2/2001 | Todd, Sr. et al. |
| 6,192,360 B1 | 2/2001 | Dumais et al. |
| 6,192,407 B1 | 2/2001 | Smith et al. |
| 6,199,102 B1 | 3/2001 | Cobb |
| 6,202,157 B1 | 3/2001 | Brownlie et al. |
| 6,219,714 B1 | 4/2001 | Inhwan et al. |
| 6,223,213 B1 | 4/2001 | Cleron et al. |
| 6,249,575 B1 | 6/2001 | Heilmann et al. |
| 6,249,807 B1 | 6/2001 | Shaw et al. |
| 6,260,043 B1 | 7/2001 | Puri et al. |
| 6,266,668 B1 | 7/2001 | Vanderveldt et al. |
| 6,269,447 B1 | 7/2001 | Maloney et al. |
| 6,269,456 B1 | 7/2001 | Hodges et al. |
| 6,272,532 B1 | 8/2001 | Feinleib |
| 6,275,942 B1 | 8/2001 | Bernhard et al. |
| 6,279,113 B1 | 8/2001 | Vaidya |
| 6,279,133 B1 | 8/2001 | Vafai et al. |
| 6,282,565 B1 | 8/2001 | Shaw et al. |
| 6,285,991 B1 | 9/2001 | Powar |
| 6,289,214 B1 | 9/2001 | Backstrom |
| 6,298,445 B1 | 10/2001 | Shostack et al. |
| 6,301,668 B1 | 10/2001 | Gleichauf et al. |
| 6,304,898 B1 | 10/2001 | Shiigi |
| 6,304,973 B1 | 10/2001 | Williams |
| 6,311,207 B1 | 10/2001 | Mighdoll et al. |
| 6,317,829 B1 | 11/2001 | Van Oorschot |
| 6,320,948 B1 | 11/2001 | Heilmann et al. |
| 6,321,267 B1 | 11/2001 | Donaldson |
| 6,324,569 B1 | 11/2001 | Ogilvie et al. |
| 6,324,647 B1 | 11/2001 | Bowman-Amuah |
| 6,324,656 B1 | 11/2001 | Gleichauf et al. |
| 6,330,589 B1 | 12/2001 | Kennedy |
| 6,347,374 B1 | 2/2002 | Drake et al. |
| 6,353,886 B1 | 3/2002 | Howard et al. |
| 6,363,489 B1 | 3/2002 | Comay et al. |
| 6,370,648 B1 | 4/2002 | Diep |
| 6,373,950 B1 | 4/2002 | Rowney |
| 6,385,655 B1 | 5/2002 | Smith et al. |
| 6,393,465 B2 | 5/2002 | Leeds |
| 6,393,568 B1 | 5/2002 | Ranger et al. |
| 6,405,318 B1 | 6/2002 | Rowland |
| 6,434,624 B1 | 8/2002 | Gai et al. |
| 6,442,588 B1 | 8/2002 | Clark et al. |
| 6,442,686 B1 | 8/2002 | McArdle et al. |
| 6,453,345 B2 | 9/2002 | Trcka et al. |
| 6,460,050 B1 | 10/2002 | Pace et al. |
| 6,460,141 B1 | 10/2002 | Olden |
| 6,470,086 B1 | 10/2002 | Smith |
| 6,473,800 B1 | 10/2002 | Jerger et al. |
| 6,487,599 B1 | 11/2002 | Smith et al. |
| 6,487,666 B1 | 11/2002 | Shanklin et al. |
| 6,502,191 B1 | 12/2002 | Smith et al. |
| 6,516,411 B2 | 2/2003 | Smith |
| 6,519,703 B1 | 2/2003 | Joyce |
| 6,539,430 B1 | 3/2003 | Humes |
| 6,546,416 B1 | 4/2003 | Kirsch |
| 6,546,493 B1 | 4/2003 | Magdych et al. |
| 6,550,012 B1 | 4/2003 | Villa et al. |
| 6,574,737 B1 | 6/2003 | Kingsford et al. |
| 6,578,025 B1 | 6/2003 | Pollack et al. |
| 6,609,196 B1 | 8/2003 | Dickinson, III et al. |
| 6,636,946 B2 | 10/2003 | Jeddelch |
| 6,650,890 B1 | 11/2003 | Iriam et al. |
| 6,654,787 B1 | 11/2003 | Aronson et al. |
| 6,661,353 B1 | 12/2003 | Gopen |
| 6,662,170 B1 | 12/2003 | Dom et al. |
| 6,675,153 B1 | 1/2004 | Cook et al. |
| 6,681,331 B1 | 1/2004 | Munson et al. |
| 6,687,687 B1 | 2/2004 | Smadja |
| 6,697,950 B1 | 2/2004 | Ko |
| 6,701,440 B1 | 3/2004 | Kim et al. |
| 6,704,874 B1 | 3/2004 | Porras et al. |
| 6,711,127 B1 | 3/2004 | Gorman et al. |
| 6,711,687 B1 | 3/2004 | Sekiguchi |
| 6,725,377 B1 | 4/2004 | Kouznetsov |
| 6,732,101 B1 | 5/2004 | Cook |
| 6,732,157 B1 | 5/2004 | Gordon et al. |
| 6,735,703 B1 | 5/2004 | Kilpatrick et al. |
| 6,738,462 B1 | 5/2004 | Brunson |
| 6,742,116 B1 | 5/2004 | Matsui et al. |
| 6,742,124 B1 | 5/2004 | Kilpatrick et al. |
| 6,742,128 B1 | 5/2004 | Joiner |
| 6,754,705 B2 | 6/2004 | Joiner et al. |
| 6,757,830 B1 | 6/2004 | Tarbotton et al. |
| 6,760,309 B1 | 7/2004 | Rochberger et al. |
| 6,768,991 B2 | 7/2004 | Hearnden |
| 6,769,016 B2 | 7/2004 | Rothwell et al. |
| 6,772,196 B1 | 8/2004 | Kirsch et al. |
| 6,775,657 B1 | 8/2004 | Baker |
| 6,792,546 B1 | 9/2004 | Shanklin et al. |
| 6,871,277 B1 | 3/2005 | Keronen |
| 6,880,156 B1 | 4/2005 | Landherr et al. |
| 6,892,178 B1 | 5/2005 | Zacharia |
| 6,892,179 B1 | 5/2005 | Zacharia |
| 6,892,237 B1 | 5/2005 | Gai et al. |
| 6,895,385 B1 | 5/2005 | Zacharia et al. |
| 6,895,438 B1 | 5/2005 | Ulrich |
| 6,907,430 B2 | 6/2005 | Chong et al. |
| 6,910,135 B1 | 6/2005 | Grainger |
| 6,928,556 B2 | 8/2005 | Black et al. |
| 6,941,348 B2 | 9/2005 | Petry et al. |
| 6,941,467 B2 | 9/2005 | Judge et al. |
| 6,968,461 B1 | 11/2005 | Lucas et al. |
| 6,981,143 B2 | 12/2005 | Mullen et al. |
| 7,051,077 B2 | 5/2006 | Lin |
| 7,076,527 B2 | 7/2006 | Bellegarda et al. |
| 7,089,428 B2 | 8/2006 | Farley et al. |
| 7,089,590 B2 | 8/2006 | Judge et al. |
| 7,092,992 B1 | 8/2006 | Yu |
| 7,093,129 B1 | 8/2006 | Gavagni et al. |
| 7,096,498 B2 | 8/2006 | Judge |
| 7,117,358 B2 | 10/2006 | Bandini et al. |
| 7,124,372 B2 | 10/2006 | Brin |
| 7,124,438 B2 | 10/2006 | Judge et al. |
| 7,131,003 B2 | 10/2006 | Lord et al. |
| 7,143,213 B2 | 11/2006 | Need et al. |
| 7,152,105 B2 | 12/2006 | McClure et al. |
| 7,155,243 B2 | 12/2006 | Baldwin et al. |
| 7,164,678 B2 | 1/2007 | Connor |
| 7,206,814 B2 | 4/2007 | Kirsch |
| 7,209,954 B1 | 4/2007 | Rothwell et al. |
| 7,213,260 B2 | 5/2007 | Judge |
| 7,219,131 B2 | 5/2007 | Banister et al. |
| 7,225,466 B2 | 5/2007 | Judge |
| 7,254,608 B2 | 8/2007 | Yeager et al. |
| 7,254,712 B2 | 8/2007 | Godfrey et al. |
| 7,260,840 B2 | 8/2007 | Swander et al. |
| 7,272,149 B2 | 9/2007 | Bly et al. |
| 7,272,853 B2 | 9/2007 | Goodman et al. |
| 7,278,159 B2 | 10/2007 | Kaashoek et al. |
| 7,349,332 B1 | 3/2008 | Srinivasan et al. |
| 7,376,731 B2 | 5/2008 | Khan et al. |
| 7,379,900 B1 | 5/2008 | Wren |
| 7,385,924 B1 | 6/2008 | Riddle |
| 7,458,098 B2 | 11/2008 | Judge et al. |
| 7,460,476 B1 | 12/2008 | Morris et al. |

(56) References Cited

U.S. PATENT DOCUMENTS

| | | |
|---|---|---|
| 7,461,339 B2 | 12/2008 | Liao et al. |
| 7,496,634 B1 | 2/2009 | Cooley |
| 7,502,829 B2 | 3/2009 | Radatti et al. |
| 7,506,155 B1 | 3/2009 | Stewart et al. |
| 7,519,563 B1 | 4/2009 | Urmanov et al. |
| 7,519,994 B2 | 4/2009 | Judge et al. |
| 7,522,516 B1 | 4/2009 | Parker |
| 7,523,092 B2 | 4/2009 | Andreev et al. |
| 7,543,053 B2 | 6/2009 | Goodman et al. |
| 7,543,056 B2 | 6/2009 | McClure et al. |
| 7,545,748 B1 | 6/2009 | Riddle |
| 7,610,344 B2 | 10/2009 | Mehr et al. |
| 7,617,160 B1 | 11/2009 | Grove et al. |
| 7,620,986 B1 | 11/2009 | Jagannathan et al. |
| 7,624,448 B2 | 11/2009 | Coffman |
| 7,644,127 B2 * | 1/2010 | Yu ............................... 709/206 |
| 7,647,321 B2 | 1/2010 | Lund et al. |
| 7,647,411 B1 | 1/2010 | Schiavone et al. |
| 7,668,951 B2 | 2/2010 | Lund et al. |
| 7,693,947 B2 | 4/2010 | Judge et al. |
| 7,694,128 B2 | 4/2010 | Judge et al. |
| 7,711,684 B2 | 5/2010 | Sundaresan et al. |
| 7,716,310 B2 | 5/2010 | Foti |
| 7,730,316 B1 * | 6/2010 | Baccash ....................... 713/176 |
| 7,739,253 B1 * | 6/2010 | Yanovsky et al. ............. 707/705 |
| 7,748,038 B2 | 6/2010 | Olivier et al. |
| 7,765,491 B1 | 7/2010 | Cotterill |
| 7,779,156 B2 | 8/2010 | Alperovitch et al. |
| 7,779,466 B2 | 8/2010 | Judge et al. |
| 7,870,203 B2 | 1/2011 | Judge et al. |
| 7,899,866 B1 * | 3/2011 | Buckingham et al. ........ 709/206 |
| 7,903,549 B2 | 3/2011 | Judge et al. |
| 7,917,627 B1 | 3/2011 | Andriantsiferana et al. |
| 7,937,480 B2 | 5/2011 | Alperovitch et al. |
| 7,941,523 B2 | 5/2011 | Andreev et al. |
| 7,949,716 B2 | 5/2011 | Alperovitch et al. |
| 7,949,992 B2 | 5/2011 | Andreev et al. |
| 7,966,335 B2 | 6/2011 | Slater et al. |
| 8,042,149 B2 | 10/2011 | Judge |
| 8,042,181 B2 | 10/2011 | Judge |
| 8,045,458 B2 | 10/2011 | Alperovitch et al. |
| 8,051,134 B1 * | 11/2011 | Begeja et al. ................. 709/206 |
| 8,069,481 B2 | 11/2011 | Judge |
| 8,079,087 B1 | 12/2011 | Spies et al. |
| 8,095,876 B1 | 1/2012 | Verstak et al. |
| 8,132,250 B2 | 3/2012 | Judge et al. |
| 8,160,975 B2 | 4/2012 | Tang et al. |
| 8,179,798 B2 | 5/2012 | Alperovitch et al. |
| 8,185,930 B2 | 5/2012 | Alperovitch et al. |
| 8,214,497 B2 | 7/2012 | Alperovitch et al. |
| 8,396,211 B2 | 3/2013 | Brown et al. |
| 8,549,611 B2 | 10/2013 | Judge et al. |
| 8,561,167 B2 | 10/2013 | Alperovitch et al. |
| 8,578,051 B2 | 11/2013 | Alperovitch et al. |
| 8,578,480 B2 | 11/2013 | Judge et al. |
| 8,589,503 B2 | 11/2013 | Alperovitch et al. |
| 8,606,910 B2 | 12/2013 | Alperovitch et al. |
| 8,621,559 B2 | 12/2013 | Alperovitch et al. |
| 8,621,638 B2 | 12/2013 | Judge et al. |
| 8,631,495 B2 | 1/2014 | Judge et al. |
| 8,635,690 B2 | 1/2014 | Alperovitch et al. |
| 2001/0037311 A1 | 11/2001 | McCoy et al. |
| 2001/0049793 A1 | 12/2001 | Sugimoto |
| 2002/0004902 A1 | 1/2002 | Toh et al. |
| 2002/0009079 A1 | 1/2002 | Jungck et al. |
| 2002/0013692 A1 | 1/2002 | Chandhok et al. |
| 2002/0016824 A1 | 2/2002 | Leeds |
| 2002/0016910 A1 | 2/2002 | Wright et al. |
| 2002/0023089 A1 | 2/2002 | Woo |
| 2002/0023140 A1 | 2/2002 | Hile et al. |
| 2002/0026591 A1 | 2/2002 | Hartley et al. |
| 2002/0032871 A1 | 3/2002 | Malan et al. |
| 2002/0035683 A1 | 3/2002 | Kaashoek et al. |
| 2002/0042876 A1 | 4/2002 | Smith |
| 2002/0046041 A1 | 4/2002 | Lang |
| 2002/0049853 A1 | 4/2002 | Chu et al. |
| 2002/0051575 A1 * | 5/2002 | Myers et al. .................. 382/202 |
| 2002/0059454 A1 | 5/2002 | Barrett et al. |
| 2002/0062368 A1 | 5/2002 | Holtzman et al. |
| 2002/0078382 A1 | 6/2002 | Sheikh et al. |
| 2002/0087882 A1 | 7/2002 | Schneier et al. |
| 2002/0095492 A1 | 7/2002 | Kaashoek et al. |
| 2002/0112013 A1 | 8/2002 | Walsh |
| 2002/0112185 A1 | 8/2002 | Hodges |
| 2002/0116627 A1 | 8/2002 | Tarbotton et al. |
| 2002/0120853 A1 | 8/2002 | Tyree |
| 2002/0133365 A1 | 9/2002 | Grey et al. |
| 2002/0138416 A1 | 9/2002 | Lovejoy et al. |
| 2002/0138755 A1 | 9/2002 | Ko |
| 2002/0138759 A1 | 9/2002 | Dutta |
| 2002/0138762 A1 | 9/2002 | Horne |
| 2002/0143963 A1 | 10/2002 | Converse et al. |
| 2002/0147734 A1 | 10/2002 | Shoup et al. |
| 2002/0147923 A1 | 10/2002 | Dotan |
| 2002/0152399 A1 | 10/2002 | Smith |
| 2002/0156668 A1 | 10/2002 | Morrow et al. |
| 2002/0159575 A1 | 10/2002 | Skladman et al. |
| 2002/0165971 A1 | 11/2002 | Baron |
| 2002/0169954 A1 | 11/2002 | Bandini et al. |
| 2002/0172367 A1 | 11/2002 | Mulder et al. |
| 2002/0178227 A1 | 11/2002 | Matsa et al. |
| 2002/0178383 A1 | 11/2002 | Hrabik et al. |
| 2002/0178410 A1 * | 11/2002 | Haitsma et al. ............... 714/709 |
| 2002/0188732 A1 | 12/2002 | Buckman et al. |
| 2002/0188864 A1 | 12/2002 | Jackson |
| 2002/0194469 A1 | 12/2002 | Dominique et al. |
| 2002/0198973 A1 | 12/2002 | Besaw |
| 2002/0199095 A1 | 12/2002 | Bandini et al. |
| 2003/0005326 A1 | 1/2003 | Flemming |
| 2003/0005331 A1 | 1/2003 | Williams |
| 2003/0009554 A1 | 1/2003 | Burch et al. |
| 2003/0009693 A1 | 1/2003 | Brock et al. |
| 2003/0009696 A1 | 1/2003 | Bunker et al. |
| 2003/0009699 A1 | 1/2003 | Gupta et al. |
| 2003/0014664 A1 | 1/2003 | Hentunen |
| 2003/0023692 A1 | 1/2003 | Moroo |
| 2003/0023695 A1 | 1/2003 | Kobata et al. |
| 2003/0023736 A1 | 1/2003 | Abkemeier |
| 2003/0023873 A1 | 1/2003 | Ben-Itzhak |
| 2003/0023874 A1 | 1/2003 | Prokupets et al. |
| 2003/0023875 A1 | 1/2003 | Hursey et al. |
| 2003/0028406 A1 | 2/2003 | Herz et al. |
| 2003/0028803 A1 | 2/2003 | Bunker, V et al. |
| 2003/0033516 A1 | 2/2003 | Howard et al. |
| 2003/0033542 A1 | 2/2003 | Goseva-Popstojanova et al. |
| 2003/0041264 A1 | 2/2003 | Black et al. |
| 2003/0046253 A1 | 3/2003 | Shetty et al. |
| 2003/0051026 A1 | 3/2003 | Carter et al. |
| 2003/0051163 A1 | 3/2003 | Bidaud |
| 2003/0051168 A1 | 3/2003 | King et al. |
| 2003/0055931 A1 | 3/2003 | Cravo De Almeida et al. |
| 2003/0061506 A1 | 3/2003 | Cooper et al. |
| 2003/0065943 A1 | 4/2003 | Geis et al. |
| 2003/0084280 A1 | 5/2003 | Bryan et al. |
| 2003/0084320 A1 | 5/2003 | Tarquini et al. |
| 2003/0084323 A1 | 5/2003 | Gales |
| 2003/0084347 A1 | 5/2003 | Luzzatto |
| 2003/0088792 A1 | 5/2003 | Card et al. |
| 2003/0093518 A1 | 5/2003 | Hiraga |
| 2003/0093667 A1 | 5/2003 | Dutta et al. |
| 2003/0093695 A1 | 5/2003 | Dutta |
| 2003/0093696 A1 | 5/2003 | Sugimoto |
| 2003/0095555 A1 | 5/2003 | McNamara et al. |
| 2003/0097439 A1 | 5/2003 | Strayer et al. |
| 2003/0097564 A1 | 5/2003 | Tewari et al. |
| 2003/0105976 A1 | 6/2003 | Copeland, III |
| 2003/0110392 A1 | 6/2003 | Aucsmith et al. |
| 2003/0110396 A1 | 6/2003 | Lewis et al. |
| 2003/0115485 A1 | 6/2003 | Milliken |
| 2003/0115486 A1 | 6/2003 | Choi et al. |
| 2003/0123665 A1 | 7/2003 | Dunstan et al. |
| 2003/0126464 A1 | 7/2003 | McDaniel et al. |
| 2003/0126472 A1 | 7/2003 | Banzhof |
| 2003/0135749 A1 | 7/2003 | Gales et al. |

(56) References Cited

U.S. PATENT DOCUMENTS

| | | |
|---|---|---|
| 2003/0140137 A1 | 7/2003 | Joiner et al. |
| 2003/0140250 A1 | 7/2003 | Taninaka et al. |
| 2003/0145212 A1 | 7/2003 | Crumly |
| 2003/0145225 A1 | 7/2003 | Bruton, III et al. |
| 2003/0145226 A1 | 7/2003 | Bruton, III et al. |
| 2003/0149887 A1 | 8/2003 | Yadav |
| 2003/0149888 A1 | 8/2003 | Yadav |
| 2003/0152076 A1 | 8/2003 | Lee et al. |
| 2003/0152096 A1 | 8/2003 | Chapman |
| 2003/0154393 A1 | 8/2003 | Young |
| 2003/0154399 A1 | 8/2003 | Zuk et al. |
| 2003/0154402 A1 | 8/2003 | Pandit et al. |
| 2003/0158905 A1 | 8/2003 | Petry et al. |
| 2003/0159069 A1 | 8/2003 | Choi et al. |
| 2003/0159070 A1 | 8/2003 | Mayer et al. |
| 2003/0167308 A1 | 9/2003 | Schran |
| 2003/0167402 A1 | 9/2003 | Stolfo et al. |
| 2003/0172166 A1 | 9/2003 | Judge et al. |
| 2003/0172167 A1 | 9/2003 | Judge et al. |
| 2003/0172289 A1 | 9/2003 | Soppera |
| 2003/0172291 A1 | 9/2003 | Judge et al. |
| 2003/0172292 A1 | 9/2003 | Judge |
| 2003/0172294 A1 | 9/2003 | Judge |
| 2003/0172301 A1 | 9/2003 | Judge et al. |
| 2003/0172302 A1 | 9/2003 | Judge et al. |
| 2003/0182421 A1 | 9/2003 | Faybishenko et al. |
| 2003/0187936 A1 | 10/2003 | Bodin et al. |
| 2003/0187996 A1 | 10/2003 | Cardina et al. |
| 2003/0204596 A1 | 10/2003 | Yadav |
| 2003/0204719 A1 | 10/2003 | Ben |
| 2003/0204741 A1 | 10/2003 | Schoen et al. |
| 2003/0212791 A1 | 11/2003 | Pickup |
| 2003/0222923 A1 | 12/2003 | Li |
| 2003/0233328 A1 | 12/2003 | Scott et al. |
| 2004/0015554 A1 | 1/2004 | Wilson |
| 2004/0025044 A1 | 2/2004 | Day |
| 2004/0034794 A1 | 2/2004 | Mayer et al. |
| 2004/0054886 A1 | 3/2004 | Dickinson et al. |
| 2004/0058673 A1 | 3/2004 | Iriam et al. |
| 2004/0059811 A1 | 3/2004 | Sugauchi et al. |
| 2004/0088570 A1 | 5/2004 | Roberts et al. |
| 2004/0098464 A1 | 5/2004 | Koch et al. |
| 2004/0111519 A1 | 6/2004 | Fu et al. |
| 2004/0111531 A1 | 6/2004 | Staniford et al. |
| 2004/0122926 A1 | 6/2004 | Moore et al. |
| 2004/0122967 A1 | 6/2004 | Bressler et al. |
| 2004/0123147 A1 | 6/2004 | White |
| 2004/0123157 A1 | 6/2004 | Alagna et al. |
| 2004/0128355 A1 | 7/2004 | Chao et al. |
| 2004/0139160 A1 | 7/2004 | Wallace et al. |
| 2004/0139334 A1 | 7/2004 | Wiseman |
| 2004/0165727 A1 | 8/2004 | Moreh et al. |
| 2004/0167968 A1 | 8/2004 | Wilson et al. |
| 2004/0177120 A1 | 9/2004 | Kirsch |
| 2004/0203589 A1 | 10/2004 | Wang et al. |
| 2004/0205135 A1 | 10/2004 | Hallam |
| 2004/0221062 A1* | 11/2004 | Starbuck et al. ............... 709/246 |
| 2004/0236884 A1* | 11/2004 | Beetz ............................ 710/68 |
| 2004/0249895 A1 | 12/2004 | Way |
| 2004/0255122 A1 | 12/2004 | Ingerman et al. |
| 2004/0267893 A1 | 12/2004 | Lin |
| 2005/0021738 A1 | 1/2005 | Goeller |
| 2005/0021997 A1 | 1/2005 | Beynon et al. |
| 2005/0033742 A1 | 2/2005 | Kamvar et al. |
| 2005/0044158 A1 | 2/2005 | Malik |
| 2005/0052998 A1 | 3/2005 | Oliver et al. |
| 2005/0060295 A1 | 3/2005 | Gould et al. |
| 2005/0060643 A1 | 3/2005 | Glass et al. |
| 2005/0065810 A1 | 3/2005 | Bouron |
| 2005/0080855 A1 | 4/2005 | Murray |
| 2005/0086300 A1 | 4/2005 | Yeager et al. |
| 2005/0091319 A1 | 4/2005 | Kirsch |
| 2005/0091320 A1 | 4/2005 | Kirsch et al. |
| 2005/0102366 A1 | 5/2005 | Kirsch |
| 2005/0120019 A1* | 6/2005 | Rigoutsos et al. ............... 707/6 |
| 2005/0141427 A1 | 6/2005 | Bartky |
| 2005/0149383 A1 | 7/2005 | Zacharia et al. |
| 2005/0159998 A1 | 7/2005 | Buyukkokten et al. |
| 2005/0160148 A1 | 7/2005 | Yu |
| 2005/0192958 A1 | 9/2005 | Widjojo et al. |
| 2005/0193076 A1 | 9/2005 | Flury et al. |
| 2005/0198159 A1 | 9/2005 | Kirsch |
| 2005/0204001 A1 | 9/2005 | Stein et al. |
| 2005/0216564 A1* | 9/2005 | Myers et al. ................... 709/206 |
| 2005/0256866 A1 | 11/2005 | Lu et al. |
| 2005/0262209 A1 | 11/2005 | Yu |
| 2005/0262210 A1 | 11/2005 | Yu |
| 2005/0262556 A1 | 11/2005 | Waisman et al. |
| 2005/0283622 A1 | 12/2005 | Hall et al. |
| 2006/0007936 A1 | 1/2006 | Shrum et al. |
| 2006/0009994 A1 | 1/2006 | Hogg et al. |
| 2006/0010212 A1 | 1/2006 | Whitney et al. |
| 2006/0015561 A1 | 1/2006 | Murphy et al. |
| 2006/0015563 A1 | 1/2006 | Judge et al. |
| 2006/0015942 A1 | 1/2006 | Judge et al. |
| 2006/0021055 A1 | 1/2006 | Judge et al. |
| 2006/0023940 A1* | 2/2006 | Katsuyama ................... 382/165 |
| 2006/0031314 A1* | 2/2006 | Brahms et al. ................ 709/206 |
| 2006/0031318 A1 | 2/2006 | Gellens |
| 2006/0031483 A1 | 2/2006 | Lund et al. |
| 2006/0036693 A1 | 2/2006 | Hulten et al. |
| 2006/0036727 A1 | 2/2006 | Kurapati et al. |
| 2006/0041508 A1 | 2/2006 | Pham et al. |
| 2006/0042483 A1 | 3/2006 | Work et al. |
| 2006/0047794 A1 | 3/2006 | Jezierski |
| 2006/0059238 A1 | 3/2006 | Slater et al. |
| 2006/0095404 A1 | 5/2006 | Adelman et al. |
| 2006/0095524 A1 | 5/2006 | Kay et al. |
| 2006/0095586 A1 | 5/2006 | Adelman et al. |
| 2006/0112026 A1 | 5/2006 | Graf et al. |
| 2006/0123083 A1* | 6/2006 | Goutte et al. .................. 709/206 |
| 2006/0129810 A1 | 6/2006 | Jeong et al. |
| 2006/0149821 A1 | 7/2006 | Rajan et al. |
| 2006/0155553 A1 | 7/2006 | Brohman et al. |
| 2006/0168024 A1 | 7/2006 | Mehr et al. |
| 2006/0168041 A1 | 7/2006 | Mishra et al. |
| 2006/0168152 A1 | 7/2006 | Soluk et al. |
| 2006/0174337 A1 | 8/2006 | Bernoth |
| 2006/0174341 A1 | 8/2006 | Judge |
| 2006/0179113 A1 | 8/2006 | Buckingham et al. |
| 2006/0184632 A1 | 8/2006 | Marino et al. |
| 2006/0191002 A1 | 8/2006 | Lee et al. |
| 2006/0212925 A1 | 9/2006 | Shull et al. |
| 2006/0212930 A1 | 9/2006 | Shull et al. |
| 2006/0212931 A1 | 9/2006 | Shull et al. |
| 2006/0225136 A1 | 10/2006 | Rounthwaite et al. |
| 2006/0230039 A1 | 10/2006 | Shull et al. |
| 2006/0230134 A1 | 10/2006 | Qian et al. |
| 2006/0248156 A1 | 11/2006 | Judge et al. |
| 2006/0251068 A1 | 11/2006 | Judge et al. |
| 2006/0253447 A1 | 11/2006 | Judge |
| 2006/0253458 A1 | 11/2006 | Dixon et al. |
| 2006/0253578 A1 | 11/2006 | Dixon et al. |
| 2006/0253579 A1 | 11/2006 | Dixon et al. |
| 2006/0253582 A1 | 11/2006 | Dixon et al. |
| 2006/0253584 A1 | 11/2006 | Dixon et al. |
| 2006/0265747 A1 | 11/2006 | Judge |
| 2006/0267802 A1 | 11/2006 | Judge et al. |
| 2006/0277259 A1 | 12/2006 | Murphy et al. |
| 2006/0277264 A1 | 12/2006 | Rainisto |
| 2007/0002831 A1 | 1/2007 | Allen et al. |
| 2007/0016954 A1 | 1/2007 | Choi et al. |
| 2007/0019235 A1 | 1/2007 | Lee |
| 2007/0025304 A1 | 2/2007 | Leelahakriengkrai et al. |
| 2007/0027992 A1 | 2/2007 | Judge et al. |
| 2007/0028301 A1 | 2/2007 | Shull et al. |
| 2007/0043738 A1 | 2/2007 | Morris et al. |
| 2007/0078675 A1 | 4/2007 | Kaplan |
| 2007/0124803 A1 | 5/2007 | Taraz |
| 2007/0130350 A1 | 6/2007 | Alperovitch et al. |
| 2007/0130351 A1 | 6/2007 | Alperovitch et al. |
| 2007/0150773 A1 | 6/2007 | Srivastava |
| 2007/0168394 A1 | 7/2007 | Vivekanand |
| 2007/0195753 A1 | 8/2007 | Judge et al. |

(56) References Cited

U.S. PATENT DOCUMENTS

| | | | |
|---|---|---|---|
| 2007/0195779 A1 | 8/2007 | Judge et al. | |
| 2007/0199070 A1 | 8/2007 | Hughes | |
| 2007/0203997 A1 | 8/2007 | Ingerman et al. | |
| 2007/0208817 A1 | 9/2007 | Lund et al. | |
| 2007/0208853 A1 | 9/2007 | Yang | |
| 2007/0214151 A1 | 9/2007 | Thomas et al. | |
| 2007/0233787 A1 | 10/2007 | Pagan | |
| 2007/0239642 A1 | 10/2007 | Sindhwani et al. | |
| 2007/0253412 A1 | 11/2007 | Batteram et al. | |
| 2007/0260691 A1 | 11/2007 | Kallqvist et al. | |
| 2008/0004048 A1 | 1/2008 | Cai et al. | |
| 2008/0005108 A1 | 1/2008 | Ozzie et al. | |
| 2008/0005223 A1 | 1/2008 | Flake et al. | |
| 2008/0022384 A1 | 1/2008 | Yee et al. | |
| 2008/0047009 A1 | 2/2008 | Overcash et al. | |
| 2008/0077517 A1 | 3/2008 | Sappington | |
| 2008/0082662 A1 | 4/2008 | Dandliker et al. | |
| 2008/0091765 A1* | 4/2008 | Gammage et al. | 709/202 |
| 2008/0103843 A1 | 5/2008 | Goeppert et al. | |
| 2008/0104180 A1 | 5/2008 | Gabe | |
| 2008/0104235 A1 | 5/2008 | Oliver et al. | |
| 2008/0120565 A1 | 5/2008 | Stiso et al. | |
| 2008/0123823 A1 | 5/2008 | Pirzada et al. | |
| 2008/0148150 A1 | 6/2008 | Mall | |
| 2008/0159632 A1* | 7/2008 | Oliver et al. | 382/209 |
| 2008/0175226 A1 | 7/2008 | Alperovitch et al. | |
| 2008/0175266 A1 | 7/2008 | Alperovitch et al. | |
| 2008/0177684 A1 | 7/2008 | Laxman et al. | |
| 2008/0177691 A1 | 7/2008 | Alperovitch et al. | |
| 2008/0178259 A1 | 7/2008 | Alperovitch et al. | |
| 2008/0178288 A1 | 7/2008 | Alperovitch et al. | |
| 2008/0184366 A1 | 7/2008 | Alperovitch et al. | |
| 2008/0256622 A1 | 10/2008 | Neystadt et al. | |
| 2008/0301755 A1 | 12/2008 | Sinha et al. | |
| 2008/0303689 A1 | 12/2008 | Iverson | |
| 2009/0003204 A1 | 1/2009 | Okholm et al. | |
| 2009/0089279 A1 | 4/2009 | Jeong et al. | |
| 2009/0103524 A1 | 4/2009 | Mantripragada et al. | |
| 2009/0113016 A1 | 4/2009 | Sen et al. | |
| 2009/0119740 A1 | 5/2009 | Alperovitch et al. | |
| 2009/0122699 A1 | 5/2009 | Alperovitch et al. | |
| 2009/0125980 A1 | 5/2009 | Alperovitch et al. | |
| 2009/0164582 A1 | 6/2009 | Dasgupta et al. | |
| 2009/0192955 A1 | 7/2009 | Tang et al. | |
| 2009/0254499 A1 | 10/2009 | Deyo | |
| 2009/0254572 A1 | 10/2009 | Redlich et al. | |
| 2009/0254663 A1 | 10/2009 | Alperovitch et al. | |
| 2009/0282476 A1 | 11/2009 | Nachenberg et al. | |
| 2010/0115040 A1 | 5/2010 | Sargent et al. | |
| 2010/0306846 A1 | 12/2010 | Alperovitch et al. | |
| 2011/0053513 A1 | 3/2011 | Papakostas et al. | |
| 2011/0280160 A1 | 11/2011 | Yang | |
| 2011/0296519 A1 | 12/2011 | Ide et al. | |
| 2012/0011252 A1 | 1/2012 | Alperovitch et al. | |
| 2012/0084441 A1 | 4/2012 | Alperovitch et al. | |
| 2012/0110672 A1 | 5/2012 | Judge et al. | |
| 2012/0174219 A1 | 7/2012 | Hernandez et al. | |
| 2012/0204265 A1 | 8/2012 | Judge | |
| 2012/0216248 A1 | 8/2012 | Alperovitch et al. | |
| 2012/0239751 A1 | 9/2012 | Alperovitch et al. | |
| 2012/0240228 A1 | 9/2012 | Alperovitch et al. | |
| 2012/0271890 A1 | 10/2012 | Judge et al. | |

FOREIGN PATENT DOCUMENTS

| | | |
|---|---|---|
| AU | 2006315184 | 5/2007 |
| AU | 2008207924 | 7/2008 |
| AU | 2008207926 | 7/2008 |
| AU | 2008207930 | 7/2008 |
| AU | 2008323779 | 5/2009 |
| AU | 2008323784 | 5/2009 |
| AU | 2008323922 | 5/2009 |
| AU | 2009203095 | 8/2009 |
| CA | 2440866 | 10/2002 |
| CA | 2478299 | 9/2003 |
| CA | 2564533 | 12/2005 |
| CA | 2586709 | 5/2006 |
| CA | 2628189 | 5/2007 |
| CA | 2654796 | 12/2007 |
| CN | 1363899 | 8/2002 |
| CN | 1471098 | 1/2004 |
| CN | 10140166 | 4/2009 |
| CN | 101443736 | 5/2009 |
| CN | 101730892 | 6/2010 |
| CN | 101730904 | 6/2010 |
| CN | 101730903 | 11/2012 |
| CN | 103095672 | 5/2013 |
| EP | 0375138 A2 | 6/1990 |
| EP | 0413537 A2 | 2/1991 |
| EP | 0420779 A2 | 4/1991 |
| EP | 0720333 A2 | 7/1996 |
| EP | 0838774 A2 | 4/1998 |
| EP | 0869652 A2 | 10/1998 |
| EP | 0907120 A2 | 4/1999 |
| EP | 1326376 | 7/2003 |
| EP | 1488316 | 12/2004 |
| EP | 1271846 | 7/2005 |
| EP | 1672558 A2 | 6/2006 |
| EP | 1819108 A2 | 8/2007 |
| EP | 1820101 | 8/2007 |
| EP | 1982540 | 10/2008 |
| EP | 2036246 | 3/2009 |
| EP | 2115642 | 11/2009 |
| EP | 2115689 | 11/2009 |
| EP | 2213056 | 8/2010 |
| EP | 2218215 | 8/2010 |
| EP | 2223258 | 9/2010 |
| EP | 2562975 | 2/2013 |
| EP | 2562976 | 2/2013 |
| EP | 2562986 | 2/2013 |
| EP | 2562987 | 2/2013 |
| GB | 2271002 | 3/1994 |
| GB | 2357932 | 7/2001 |
| IN | 3279-DELNP-2007 | 8/2007 |
| IN | 4233-DELNP-2007 | 8/2008 |
| IN | 4842/CHENP/2009 | 1/2010 |
| IN | 4763/CHENP/2009 | 7/2010 |
| JP | 2000148276 A | 5/2000 |
| JP | 2000215046 A | 8/2000 |
| JP | 2001028006 A | 1/2001 |
| JP | 2003-150482 | 5/2003 |
| JP | 2004-533677 | 11/2004 |
| JP | 2004537075 A | 12/2004 |
| JP | 2005-520230 | 7/2005 |
| JP | 2006268544 A | 10/2006 |
| JP | 2006-350870 | 12/2006 |
| JP | 18350870 | 12/2006 |
| JP | 2007540073 A | 6/2008 |
| JP | 2009-516269 | 4/2009 |
| KR | 10-0447082 | 9/2004 |
| KR | 2006-0012137 | 2/2006 |
| KR | 2006-0028200 | 3/2006 |
| KR | 2006028200 A | 3/2006 |
| KR | 1020060041934 | 5/2006 |
| KR | 10-0699531 | 3/2007 |
| KR | 699531 B1 | 3/2007 |
| KR | 10-0737523 | 7/2007 |
| KR | 737523 B1 | 7/2007 |
| KR | 10-0750377 | 8/2007 |
| KR | 750377 B1 | 8/2007 |
| KR | 447082 Y1 | 12/2009 |
| SG | 106744 | 11/2004 |
| SG | 142513 | 6/2008 |
| WO | WO 96/35994 | 11/1996 |
| WO | WO9635994 A1 | 11/1996 |
| WO | WO 99/05814 | 2/1999 |
| WO | WO 99/33188 | 7/1999 |
| WO | WO 99/37066 | 7/1999 |
| WO | WO0007312 A1 | 2/2000 |
| WO | WO0008543 A1 | 2/2000 |
| WO | WO 00/42748 | 7/2000 |
| WO | WO 00/59167 | 10/2000 |
| WO | WO 01/17165 | 3/2001 |

(56) References Cited

FOREIGN PATENT DOCUMENTS

| WO | WO 01/22686 | 3/2001 |
|---|---|---|
| WO | WO 01/50691 | 7/2001 |
| WO | WO 01/76181 | 10/2001 |
| WO | WO0180480 A1 | 10/2001 |
| WO | WO 02/13469 | 2/2002 |
| WO | WO 02/13489 | 2/2002 |
| WO | WO 02/15521 | 2/2002 |
| WO | WO0188834 A3 | 5/2002 |
| WO | WO 02/075547 | 9/2002 |
| WO | WO02082293 A1 | 10/2002 |
| WO | WO 02/091706 | 11/2002 |
| WO | WO 03/077071 | 9/2003 |
| WO | WO 2004/061703 | 7/2004 |
| WO | WO2004061698 A1 | 7/2004 |
| WO | WO 2004/081734 | 9/2004 |
| WO | WO2004088455 A2 | 10/2004 |
| WO | WO 2005/006139 | 1/2005 |
| WO | WO2005086437 A1 | 9/2005 |
| WO | WO 2005/116851 | 12/2005 |
| WO | WO 2005/119485 | 12/2005 |
| WO | WO 2005/119488 | 12/2005 |
| WO | WO 2006/029399 | 3/2006 |
| WO | WO 2006/119509 | 3/2006 |
| WO | WO 2006/052736 | 5/2006 |
| WO | WO2007030951 A1 | 3/2007 |
| WO | WO 2007/059428 | 5/2007 |
| WO | WO 2007/146690 | 12/2007 |
| WO | WO 2007/146696 | 12/2007 |
| WO | WO 2007/146701 | 12/2007 |
| WO | WO 2008/008543 | 1/2008 |
| WO | WO 2008/091980 | 7/2008 |
| WO | WO 2008/091982 | 7/2008 |
| WO | WO 2008/091986 | 7/2008 |
| WO | WO 2009/146118 | 2/2009 |
| WO | WO 2009/061893 | 5/2009 |
| WO | WO 2009/062018 | 5/2009 |
| WO | WO 2009/062023 | 5/2009 |

OTHER PUBLICATIONS

Kim, JiSoo et al. "Text Locating from Natural Scene Images Using Image Intensities", 2005 IEEE.*
Sobottka, K. et al. Text extraction from colored book and journal covers, 2000.*
Thomas, Ross et al. "The Game Goes on: An Analysis of Modern SPAM Techniques", 2006.*
Natsev, Apostol et al. "WALRUS: A Similarity Retrieval Algorithm for Image Databases", Mar. 2004.*
Schleimer, Saul eta l. "Winnowing: Local Algorithms for Document Fingerprinting", Jun. 2003.*
Wu, Ching-Tung, et al. "Using visual features for anti-spam filtering." Image Processing, 2005. ICIP 2005. IEEE International Conference on. vol. 3. IEEE, 2005.*
Article entitled "An Example-Based Mapping Method for Text Categorization and Retrieval" by Yang et. al., in *ACM Transactions on Information Systems*, Jul. 1994, vol. 12, No. 3, pp. 252-277.
Article entitled "A Comparison of Two Learning Algorithms for Text Categorization" by Lewis et al., in Third Annual Symposium on *Document Analysis and Information Retrieval*, Apr. 11-13, 1994, pp. 81-92.
Article entitled "Learning Limited Dependence Bayesian Classifiers" by Sahami, in *Proceedings of the Second International Conference on Knowledge Discovery and Data Mining*, 1996, pp. 335-338.
Article entitled "An Evaluation of Phrasal and Clustered Representations on a Text Categorization Task" by Lewis, in *15th Ann Int'l SIGIR*, Jun. 1992, pp. 37-50.
Book entitled *Machine Learning* by Mitchell, 1997, pp. 180-184.
Article entitled "Learning Rules that Classify E-mail" by Cohen, pp. 1-8. Date unknown.
Article entitled "Hierarchically classifying documents using very few words" by Koller et. al., in *Proceedings of the Fourteenth International Conference on Machine Learning*, 1997.
Article entitled "Classification of Text Documents" by Li et. al., in *The Computer Journal*, vol. 41, No. 8, 1998, pp. 537-546.
Article entitled "Issues when designing filters in messaging systems" by Palme et. al., in 19 *Computer Communications*, 1996, pp. 95-101.
Article entitled "Text Categorization with Support Vector Machines: Learning with Many Relevant Features" by Joachins in *Machine Learning: ECML-98*, Apr. 1998, pp. 1-14.
Article entitled "Hierarchical Bayesian Clustering for Automatic Text Classification" by Iwayama et al. in *Natural Language*, pp. 1322-1327. Date unknown.
Article entitled "Smokey: Automatic Recognition of Hostile Messages" by Spertus in *Innovative Applications* 1997, pp. 1058-1065.
Article entitled "A Comparison of Classifiers and Document Representations for the Routing Problem" by Schutze. Date unknown.
Article entitled "CAFE: A Conceptual Model for Managing Information in Electronic Mail" by Takkinen et al. in *Proc. 31st Annual Hawaii International Conference on System Sciences*, 1998, pp. 44-53.
Article entitled "A Comparative Study on Feature Selection in Text Categorization" by Yang et. al. Date unknown.
Article entitled "Spam!" by Cranor et. al. in *Communications of the ACM*, vol. 41, No. 8, Aug. 1998, pp. 74-83.
Article entitled "Sendmail and Spam" by LeFebvre in *Performance Computing*, Aug. 1998, pp. 55-58.
Article entitled "Implementing a Generalized Tool for Network Monitoring" by Ranum et. al. in *LISA XI*, Oct. 26-31, 1997, pp. 1-8.
Article entitled "Method for Automatic Contextual Transposition Upon Receipt of Item of Specified Criteria" printed Feb. 1994 in *IBM Technical Disclosure Bulletin*, vol. 37, No. 2B, p. 333.
Article entitled "Toward Optimal Feature Selection" by Koller et al., in *Machine Learning: Proc. of the Thirteenth International Conference*, 1996.
Website: Technical Focus—Products—Entegrity AssureAccess. www2.entegrity.com.
Website: Create Secure Internet Communication Channels—Atabok Homepage. www.atabok.com.
Website: Atabok VCNMAIL™ Secure Email Solution—Atabok Related Produces. www.atabok.com.
Website: Atabok VCN Auto-Exchange™—Atabok Related Produces. www.atabok.com.
Website: Controlling Digital Assets Is a Paramount Need for All Business—Atabok Related Produces. www.atabok.com.
Website: Control Your Confidential Communications with Atabok—Atabok Related Produces. www.atabok.com.
Website: Entrust Entelligence—Entrust Homepage. www.entrust.com.
Website: E-mail Plug-in—Get Technical/Interoperability—Entrust Entelligence. www.entrust.com.
Website: E-mail Plug-in—Get Technical/System Requirements—Entrust Entelligence. www.entrust.com.
Website: E-mail Plug-in—Features and Benefits—Entrust Entelligence. www.entrust.com.
Website: Internet Filtering Software—Internet Manager Homepage. www.elronsw.com.
Website: ESKE—Email with Secure Key Exchange—ESKE. www.danu.ie.
Website: Terminet—ESKE. www.danu.ie.
Website: Baltimore Focus on e-Security—Baltimore Technologies. www.baltimore.com.
Article entitled "Securing Electronic Mail Systems" by Serenelli et al., in *Communications-Fusing Command Control and Intelligence: MILCOM '92*, 1992, pp. 677-680.
Article entitled "Integralis' Minesweeper defuses E-mail bombs" by Kramer et. al., in *PC Week*, Mar. 18, 1996, p. N17-N23.
Article entitled "A Toolkit and Methods for Internet Firewalls" by Ranum et. al., in *Proc. of USENIX Summer 1994 Technical Conference*, Jun. 6-10, 1994, pp. 37-44.
Article entitled "Firewall Systems: The Next Generation" by McGhie, in *Integration Issues in Large Commercial Media Delivery Systems: Proc. of SPIE—The International Society for Optical Engineering*, Oct. 23-24, 1995, pp. 270-281.

(56) References Cited

OTHER PUBLICATIONS

Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.
Article entitled "Designing an Academic Firewall: Policy, Practice, and Experience with SURF" by Greenwald et. al., in *Proc. of the 1996 Symposium on Network and Distributed Systems Security*, 1996, pp. 1-14.
Article entitled "X Through the Firewall, and Other Application Relays" by Treese et. al. in *Proc. of the USENIX Summer 1993 Technical Conference*, Jun. 21-25, 1993, pp. 87-99.
Article entitled "Firewalls for Sale" by Bryan, in *BYTE*, Apr. 1995, pp. 99-104.
Article entitled "A DNS Filter and Switch for Packet-filtering Gateways" by Cheswick et al., in *Proc. of the Sixth Annual USENIX Security Symposium: Focusing on Applications of Cryptography*, Jul. 22-25, 1996, pp. 15-19.
Article entitled "Safe Use of X Window System Protocol Across a Firewall" by Kahn, in *Proc. of the Fifth USENIX UNIX Security Symposium*, Jun. 5-7, 1995, pp. 105-116.
Article entitled "Automating the OSI to Internet Management Conversion Through the Use of an Object-Oriented Platform" by Pavlou et al., in *Proc. of the IFIP TC6/WG6.4 International Conference on Advanced Information Processing Techniques for LAN and MAN Management*, Apr. 7-9, 1993, pp. 245-260.
Article entitled "A Secure Email Gateway (Building an RCAS External Interface)" by Smith, in *Tenth Annual Computer Security Applications Conference*, Dec. 5-9, 1994, pp. 202-211.
Article entitled "Secure External References in Multimedia Email Messages" by Wiegel, in *3rd ACM Conference on Computer and Communications Security*, Mar. 14-16, 1996, pp. 11-18.
Memo entitled "SOCKS Protocol Version 5" by Leech et. al., in *Standards Track*, Mar. 1996, pp. 1-9.
Article entitled "Securing the Web: fire walls, proxy servers, and data driven attacks" by Farrow in *InfoWorld*, Jun. 19, 1995, vol. 17, No. 25, p. 103.
Website: Go Secure! for Microsoft Exchange—Products/Services—Verisign, Inc. www.verisign.com.
Article entitled "MIMEsweeper defuses virus network, 'net mail bombs" by Avery, in *Info World*, May 20, 1996, vol. 12, No. 21, p. N1.
Article entitled "Stomping out mail viruses" by Wilkerson, in *PC Week*, Jul. 15, 1996, p. N8.
Abika.com, "Trace IP address, email or IM to owner or use," http://www.abika.com/help/IPaddressmap.htm, 3 pages. (Jan. 25, 2006).
Abika.com, "Request a Persons Report," http:www.abika.com/forms/Verifyemailaddress.asp, 1 page. (Jan. 26, 2006).
Aikawa,Narichika, Q&A Collection: Personal computers have been introduced to junior high schools and accessing to the Internet has been started; however, we want to avoid the students from accessing harmful information. What can we do?, DOS/V Power Report, vol. 8, No. 5, Japan, Impress Co., Ltd., May 1, 1998, p. 358-361.
Ando, Ruo, Real-time neural detection with network capturing, Study report from Information Processing Society of Japan, vol. 2002, No. 12, IPSJ SIG Notes, Information Processing Society of Japan, 2002, Feb. 15, 2002, p. 145-150.
Article entitled "A Short Tutorial on Wireless LANs and IEEE 802.11" by Lough et al., printed May 27, 2002, in The IEEE Computer Society's Student Newsletter, Summer 1997, vol. 5, No. 2, 6 pages.
Edakandi, Ashwin Examiner's Report for Australian Patent Application No. 2006315184, dated Mar. 31, 2010, 8 pages.
European Supplementary Search Report for EP Application No. 03723691.6 dated Jun. 29, 2010, 6 pages.
China Patent Agent (H.K.) Ltd., First Office Action for Chinese Patent Application No. 200680050707.7, dated Mar. 9, 2010, 12 pages.
First/Consequent Examination Report for IN Application No. 2639/DELNP/2004, Apr. 8, 2011, 3 pages.
Official Action (with uncertified Translation), Japanese Patent Application No. 2003-575222, Sep. 25, 2009, 13 pages.

Office Action for JP Application No. 2007-540073, dated Dec. 14, 2010 (with translation), 9 pages.
Lane, Terran et al., "Sequence Matching and Learning in Anomaly Detection for Computer Security," AAAI Technical Report WS-97-07, 1997, p. 43-49.
Shishibori, Masami et al., "A Filtering Method for Mail Documents Using Personal Profiles," IEICE Technical Report, The Institute of Electronics, Information and Communication Engineers, vol. 98, No. 486, Dec. 17, 1998, p. 9-16.
US Patent and Trademark Office Final Office Action Summary for U.S. Appl. No. 11/423,329, mailed Jan. 14, 2010, 21 pages.
US Patent and Trademark Office Nonfinal Office Action Summary for U.S. Appl. No. 11/423,329, mailed Jun. 29, 2009, 18 pages.
US Patent and Trademark Office Nonfinal Office Action Summary for U.S. Appl. No. 11/626,470, mailed Jan. 19, 2010, 21 pages.
US Patent and Trademark Office Final Office Action Summary for U.S. Appl. No. 11/142,943, mailed Apr. 29, 2009, 15 pages.
US Patent and Trademark Office Nonfinal Office Action Summary for U.S. Appl. No. 11/937,274, mailed Jun. 29, 2009, 20 pages.
US Patent and Trademark Office Restriction Requirement for U.S. Appl. No. 11/142,943, mailed Jan. 13, 2009, 7 pages.
US Patent and Trademark Office Nonfinal Office Action Summary for U.S. Appl. No. 11/142,943, mailed Jun. 26, 2008, 16 pages.
US Patent and Trademark Office Nonfinal Office Action Summary for U.S. Appl. No. 11/937,274, mailed Dec. 9, 2009, 26 pages.
US Patent and Trademark Office Nonfinal Office Action Summary for U.S. Appl. No. 11/142,943, mailed Dec. 31, 2009, 15 pages.
US Patent and Trademark Office Nonfinal Office Action Summary for U.S. Appl. No. 11/626,603, mailed Dec. 2, 2009, 22 pages.
US Patent and Trademark Office Restriction Requirement for U.S. Appl. No. 11/626,603, mailed Aug. 11, 2009, 7 pages.
US Patent and Trademark Office Nonfinal Office Action Summary for U.S. Appl. No. 11/626,479, mailed Mar. 17, 2010, 38 pages.
Website: ESKE—Email with Secure Key Exchange—ESKE. www.danu.ie, Feb. 19, 2002, 1 page.
PCT Notification of Search Report & Written Opinion, PCT/US2008/082781, Aug. 7, 2009, 12 pages.
PCT Notification of International Search Report & Written Opinion, PCT/US2008/051869, mailed Jun. 5, 2008, 11 pages.
Official Action (with uncertified Translation), Japanese Patent Application No. 2007-540073, Jul. 7, 2011, 4 pages.
PCT Notification Concerning Transmittal of International Preliminary Report on Patentability, PCT/US2008/051865, mailed Aug. 6, 2009, 14 pages.
PCT Notification of International Search Report & Written Opinion, PCT/US2009/039401, mailed Nov. 16, 2009, 14 pages.
PCT Notification Concerning Transmittal of International Preliminary Report on Patentability, PCT/US2008/051876, mailed Aug. 6, 2009, 8 pages.
PCT Notification Concerning Transmittal of International Preliminary Report on Patentability, PCT/US2008/082771, mailed May 20, 2010, 10 pages.
PCT Notification of International Search Report & Written Opinion, PCT/US2008/082771, mailed Apr. 24, 2009, 14 pages.
US Patent and Trademark Office final Office Action Summary for U.S. Appl. No. 11/626,568, mailed Aug. 24, 2011, 17 pages.
US Patent and Trademark Office final Office Action Summary for U.S. Appl. No. 11/626,603, mailed Mar. 28, 2011, 35 pages.
Supplementary European Search Report, PCT Application No. PCT/US2006/060771, dated Dec. 3, 2010, 142 pages.
Supplementary European Search Report, PCT Application No. PCT/US2006/060771, dated Dec. 21, 2010, 1 page.
Extended European Search Report, PCT Application No. PCT/US2006/060771, dated Mar. 12, 2010, 7 pages.
Japanese Office Action for JP Application No. 2008-540356, dated Sep. 21, 2011, 2 pages.
Notification Concerning Availability of the Publication of the International Application, PCT/US2006/060771, dated Apr. 17, 2008, 4 pages.

(56) References Cited

OTHER PUBLICATIONS

Luk, W., et al. "Incremental Development of Hardware Packet Filters", Proc. International Conference on Engineering of Reconfigurable Systems and Algorithms (ERSA). Jan. 1, 2001. pp. 115-118. XP055049950. Retrieved from the Internet: URL:www.doc.ic.ac.uk/-sy99/c1.ps.
Georgopoulos, C. et al., "A Protocol Processing Architecture Backing TCP/IP-based Security Applications in High Speed Networks". Interworking 2000. Oct. 1, 2000. XP055049972. Bergen. Norway Available online at <URL:http://pelopas.uop.gr/-fanis/html_files/pdf_files/papers/invited/I2_IW2002.pdf>.
"Network Processor Designs for Next-Generation Networking Equipment". White Paper Ezchip Technologies. XX. XX. Dec. 27, 1999. pp. 1-4. XP002262747.
Segal, Richard, et al. "Spam Guru: An Enterprise Anti-Spam Filtering System", IBM, 2004 (7 pages).
Nilsson, Niles J., "Introduction to Machine Learning, an Early Draft of a Proposed Textbook", Nov. 3, 1998; XP055050127; available online at <URL http://robotics.stanford.edu/~nilsson/MLBOOK.pdf >.
Androutsopoulos, Ion et al., "Learning to Filter Spam E-Mail: A Comparison of a Naive Bayesian and a Memory-Based Approach"; Proceedings of the Workshop "Machine Learning and Textual Information Access"; 4th European Conference on Principles and Practice of Knowledge Discovery in Databases (PKDD-2000). Sep. 1, 2000 [XP055050141] Lyon, France; available online at <URL http://arxiv.org/ftp/cs/papers/0009/0009009.pdf>.
Rennie, J D M, "iFile: An application of Machine Learning to E-Mail Filtering"; Workshop on Text Mining; Aug. 1, 2000. [XP002904311]. pp. 1-6.
Berners-Lee, T. et al., "Uniform Resource Identifiers (URI): Generic Syntax", RFC 2396, Aug. 1998.
Crispin, M., "Internet Message Access Protocol—Version 4rev1", RFC 2060, Dec. 1996.
Franks, J. et al., "HITP Authentication: Basic and Digest Access Authentication", RFC 2617, Jun. 1999.
Klensin, J. et al., "SMTP Service Extensions", RFC 1869, Nov. 1995.
Moats, R., "URN Syntax", RFC 2141, May 1997.
Moore, K., "SMTP Service Extension for Delivery Status Notifications", RFC 1891, Jan. 1996.
Myers, J. et al., "Post Office Protocol—Version 3", RFC 1939, May 1996.
Nielsen, H., et al., "An HTTP Extension Framework", RFC 2774, Feb. 2000.
Postel, J., "Simple Mail Transfer Protocol", RFC 821, Aug. 1982.
Braden, R., "Requirements for Internet Hosts—Application and Support", RFC 1123, Oct. 1989, 98 pages.
Fielding, R. et al., "Hypertext Transfer Protocol—HTTP/1.1", RFC 2616, Jun. 1999, 114 pages.
Tang, Yuchun, "Granular Support Vector Machines Based on Granular Computing, Soft Computing and Statistical Learning." Georgia State University: May 2006.
Drucker et al; "Support Vector Machines for Spam Categorization"; 1999; IEEE Transactions on Neural Networks; vol. 10, No. 5; pp. 1048-1054.
Graf et al.; "Parallel Support Vector Machines: The Cascade SVM"; 2005; pp. 1-8.
Rokach, Lior et al.; "Decomposition methodology for classification tasks"; 2005; Springer-Verlag London Limited; Pattern Analysis & Applications; pp. 257-271.
Wang, Jigang et al.; "Training Data Selection for Support Vector Machines"; 2005; ICNC 2005, LNCS 3610; pp. 554-564.
Skurichina, Marina et al.; Bagging, Boosting and the Random Subspce Method for Linear Classifiers; 2002; Springer-Verlag London Limited; pp. 121-135.
Tao, Dacheng et al.; "Asymmetric Bagging and Random Subspace for Support Vector Machines-Based Relevance Feedback in Image Retrieval"; 2006; IEEE Computer Society; pp. 1088-1099.

Kotsiantis, S. B. et al.; "Machine learning: a review of classification and combining techniques"; 2006; Springer; Artificial Intelligence Review; pp. 159-190.
Gupta, et al., "A Reputation System for Peer-to-Peer Networks," ACM (2003).
Golbeck, et al., "Inferring Repuratoin on the Semtnatic Web," ACM, 2004.
Krishnaswamy et al—Verity: A QoS Metric for Selecting Web Services and Providers, Proceedings of the Fourth International Conference on Web Information Systems Engineering Workshops (WISEW'03), IEEE, 2004.
Kamvar et al., The EigenTrust Algorithm for Reputation Management in P2P Networks, ACM, WWW2003, Budapest, Hungary, May 20-24, 2003, pp. 640-651.
Blum, Richard, Open Source E-Mail Security, SAMS XP009166200, ISBN 978-0-672-32237-2, Oct. 20, 2001 (pp. 139-158).
Feitelson et al., "Self-Tuning Systems", Mar./Apr. 1999, IEEE, 0740-7459/99, pp. 52-60.
Anklesaria, F. et al., "The Internet Gopher Protocol", RFC 1436, Mar. 1993.
IronMail™ Version 2.1, User's Manual. © 2001, published by CipherTrust, Inc., 114 pages [U.S. Appl. No. 10/361,067].
IronMail™ version 2.5, User's Manual, © 2001, published by CipherTrust, Inc., 195 pages [U.S. Appl. No. 10/361,067].
IronMail™ version 2.5.1, User's Manual, © 2001, published by CipherTrust, Inc., 203 pages [U.S. Appl. No. 10/361,067].
IronMail™ version 3.0, User's Manual, © 2002, published by CipherTrust, Inc., 280 pages.
IronMail™ version 3.0.1, User's Manual, © 2002, published by CipherTrust, Inc., 314 pages.
IronMailTM version 3.1, User's Manual, published by CipherTrust, Inc., 397 pages [U.S. Appl. No. 10/361,067].
Okumura, Motonobu, "E-Mail Filtering by Relation Learning", IEICE Technical Report, vol. 103, No. 603, The Institute of Electronics, Information and Communication Engineers, Jan. 19, 2004, vol. 103, p. 1-5 [English Abstract Only].
Inoue, Naomi, "Computer and Communication: Recent State of Filtering Software," ISPJ Magazine, vol. 40, No. 10, Japan, The Institute of Electronics, Information and Communication Engineers, Oct. 15, 1999, vol. 40 p. 1007-1010 [English Abstract Only].
Davis, C., et al., "A Means for Expressing Location Information in the Domain Name System," RFC 1876, Jan. 1996.
Australian Patent Office Examination Report in Australian Patent Application Serial No. 2003230606 mailed on Apr. 3, 2008.
Australian Patent Office Examination Report No. 1 in Australian Patent Application Serial No. 2009203095 mailed pm Oct. 12, 2010.
Australian Patent Office Examination Report No. 2 in Australian Patent Application Serial No. 2009203095 mailed pm Feb. 2, 2012.
Australian Patent Office Examination Report No. 3 in Australian Patent Application Serial No. 200903095 mailed on Mar. 28, 2012.
Canadian Intellectual Property Office Examination Report in Canadian Patent Application Serial No. 2478299 mailed on Jul. 9, 2010.
European Patent Office Action for EP Application No. 03723691.6, dated Oct. 12, 2010, 6 pages.
European Patent Office Communication Pursuant to Article 94(3) EPC in EP Application Serial No. 03723691.3 mailed on Jan. 30, 2013.
European Patent Office Search Report and Opinion in EP Application Serial No. 12189404.2 mailed on Jan. 30, 2013.
European Patent Office Search Report and Opinion in EP Application Serial No. 12189407.5 mailed on Jan. 28, 2013.
European Patent Office Search Report and Opinion in EP Application Serial No. 12189412.5 mailed on Jan. 30, 2013.
European Patent Office Search Report and Opinion in EP Application Serial No. 12189413.3 mailed on Jan. 24, 2013.
European Patent Office Communication Purusant to Article 94(3) EPC mailed on Sep. 26, 2013.
PCT International Search Report in PCT International Application Serial No. PCT/US2003/007042 mailed on Nov. 13, 2003.
PCT International Preliminary Examination Report in PCT International Application Serial No. PCT/US2003/007042 mailed on Jan. 29, 2004.

(56) References Cited

OTHER PUBLICATIONS

Australian Patent Office Examination Report in Australian Patent Application Serial No. 2005304883 mailed on Apr. 16, 2010.
Canadian Patent Office Action in Canadian Patent Application Serial No. 2586709 mailed on Mar. 20, 2013.
China, State Intellectual Property Office, P.R. China, First Office Action in Chinese Patent Application Serial No. 200580046047 mailed on Mar. 1, 2010.
China, State Intellectual Property Office, P.R. China, Second Office Action in Chinese Patent Application Serial No. 200580046047 mailed on Dec. 7, 2010.
China, State Intellectual Property Office, P.R. China, Decision on Rejecton in Chinese Patent Application Serial No. 200580046047 mailed on Jun. 27, 2011.
China, State Intellectual Property Third Office Action in Chinese Patent Application Serial No. 200580046047 mailed on Aug. 30, 2013.
European Patent Office Supplementary Search Report and Written Opinion in EP Application Serial No. 05823134.1 mailed on Jun. 3, 2013.
Japanese Examiner Koji Tamaki, Office Actrion in JP App. Ser. No. 2007-540073 dated Dec. 16, 2010 (4 pages).
PCT International Search Report and Written Opinion in PCT Application Serial No. PCT/US2005/039978 mailed on Jul. 8, 2008.
PCT International Preliminary Report on Patentability in PCT Application Serial No. PCT/US2005/039978 mailed on May 5, 2009.
Examiner's Report for Australian Patent Application Serial No. 2006315184 dated Mar. 31, 2010.
Canadian Office Action in Canadian Patent Application Serial No. 2,628,189 mailed on Dec. 8, 2011.
Canadian Office Action in Canadian Patent Application Serial No. 2,628,189 mailed on Jan. 31, 2013.
Canadian Office action in Canadian Patent Application Serial No. 2,628,189 mailed on Sep. 10, 2013.
European Patent Office Search Report dated Nov. 26, 2010 and Written Opinion in EP Application Serial No. 06839820.5-2416 mailed on Dec. 3, 2010.
European Patent Office Communication Pursuant to Article 94(3) EPC 06839820.5-2416 mailed on Oct. 18, 2011 (including Annex EP Search Report dated Nov. 26, 2010).
European Patent Office Summons to Attend Oral Proceedings Pursuant to Rule 115(1) EPC in EP Application Serial No. 06839820.5 mailed on Aug. 30, 2013.
PCT International Search Report and Written Opinion in PCT International Patent Application Serial No. PCT/US2006/060771 mailed on Feb. 12, 2008.
PCT International Preliminary Report on Patentability in PCT International Patent Application Serial No. PCT/US2006/060771 mailed on May 14, 2008.
Australian Patent Office First Examination Report and SIS in Australian Patent Application Serial No. 2008207924 mailed on Dec. 14, 2011.
State Intellectual Property Office, P.R. China First Office Action dated Nov. 9, 2011 in Chinese Patent Application Serial. No. 200880009672.1.
State Intellectual Property Office, P.R. China Second Office Action dated Aug. 9, 2012 in Chinese Patent Application Serial No. 200880009672.1.
State Intellectual Property Office, P.R. China Third Office Action dated Nov. 9, 2012 in Chinese Patent Application Serial No. 200880009672.1.
State Intellectual Property Office, P.R. China Fourth Office Action dated Jun. 5, 2013 in Chinese Patent Application Serial No. 200880009672.1.
European Patent Office Invitation Pursuant to Rule 62a(1) EPC mailed on Oct. 11, 2011.
PCT International Search Report in PCT International Application Serial No. PCT/US2008/051865 dated Jun. 4, 2008.
PCT International Preliminary Report on Patentability in PCT International Patent Application Serial No. PCT/US2008/051869 mailed on Jul. 28, 2009.
Australian Patent Office Patent Examination Report No. 1 issued in Australian Patent Application Serial No. 2008207930 on Dec. 9, 2011.
Australian Patent Office Examination Report No. 2 issued in Australian Patent Application Serial No. 2008207930 on Sep. 10, 2012.
China, State Intellectual Property Office, P.R. China, First Office Action in Chinese Patent Application Serial No. 200880009762.0 mailed on Sep. 14, 2011.
EPO Extended Search Report and Opinion in EP Application Serial No. 08728178.8 mailed on Aug. 2, 2012.
PCT International Search Report and Written Opinion in PCT International Application Serial No. PCT/US2008/051876 mailed on Jun. 23, 2008.
EPO Communication Pursuant to Article 94(3) EPC in EP Application Serial No. 08847431.7-2416 mailed on Dec. 11, 2012.
EPO Supplementary European Search Report in EP Application Serial No. 08847431.7-2416 mailed on Dec. 3, 2012.
Australian Patent Office Examination Report No. 1 issued in Australian Patent Application Serial No. 2008323784 issue on Jul. 13, 2012.
Australian Patent Office Examination Report No. 2 issued in Australian Patent Application Serial. No. 2008323784 issue on Jul. 19, 2013.
Australian Patent Office Examination Report No. 3 issued in Australian Patent Application Serial No. 2008323784 mailed on Sep. 3, 2013.
PCT International Search Report and Written Opinion in PCT Application Serial No. PCT/2008/082781 mailed on Aug. 7, 2009.
International Preliminary Report on Patentability in PCT International Application Serial No. PCT/US2008/082781 mailed on May 11, 2010.
Australian Patent Office First Examination Report in Australian Patent Application Serial No. 2009251584 dated Feb. 7, 2013.
China Patent Office First Office Action in Chinese Patent Application Serial No. 200980120009.3 mailed on Mar. 26, 2013.
EP Supplementary European Search Report in EP Application Serial No. 09755480.2-2416 mailed on Dec. 3, 2012.
EPO Communication Pursuant to Article 94(3) EPC (Supplementary Search Report) in EP Application Serial No. 09755480.2-2416 mailed on Dec. 11, 2012.
International Preliminary Report on Patentability and Written Opinion in PCT Application Serial No. PCT/US2009/039401 mailed on Oct. 14, 2010.
European Patent Office Extended Search Report and Opinion in EP Application Serial No. 08728168.9 mailed on Jan. 29, 2014.
State Intellectual Property Office, P.R. China Decision on Rejection dated Oct. 8, 2013 in Chinese Patent Application Serial No. 200880009672.1.

\* cited by examiner

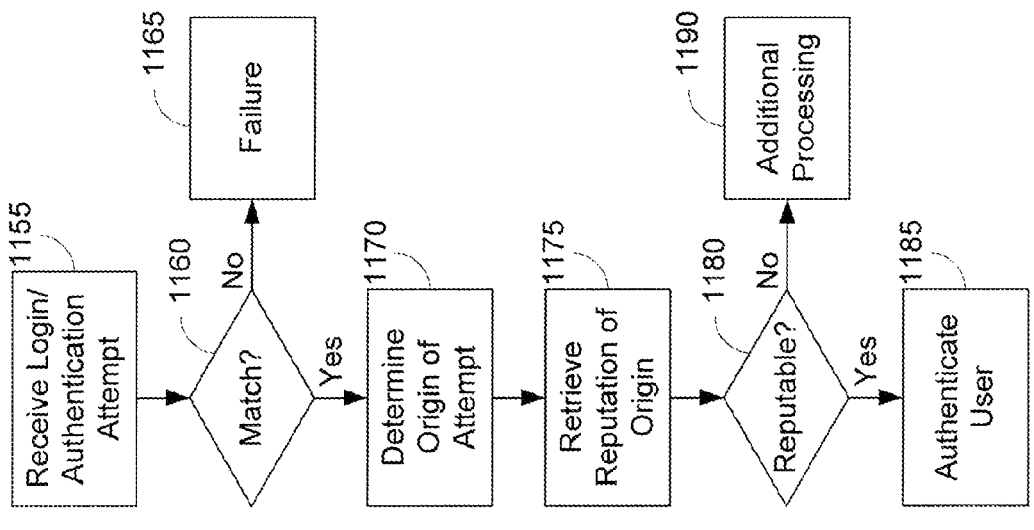
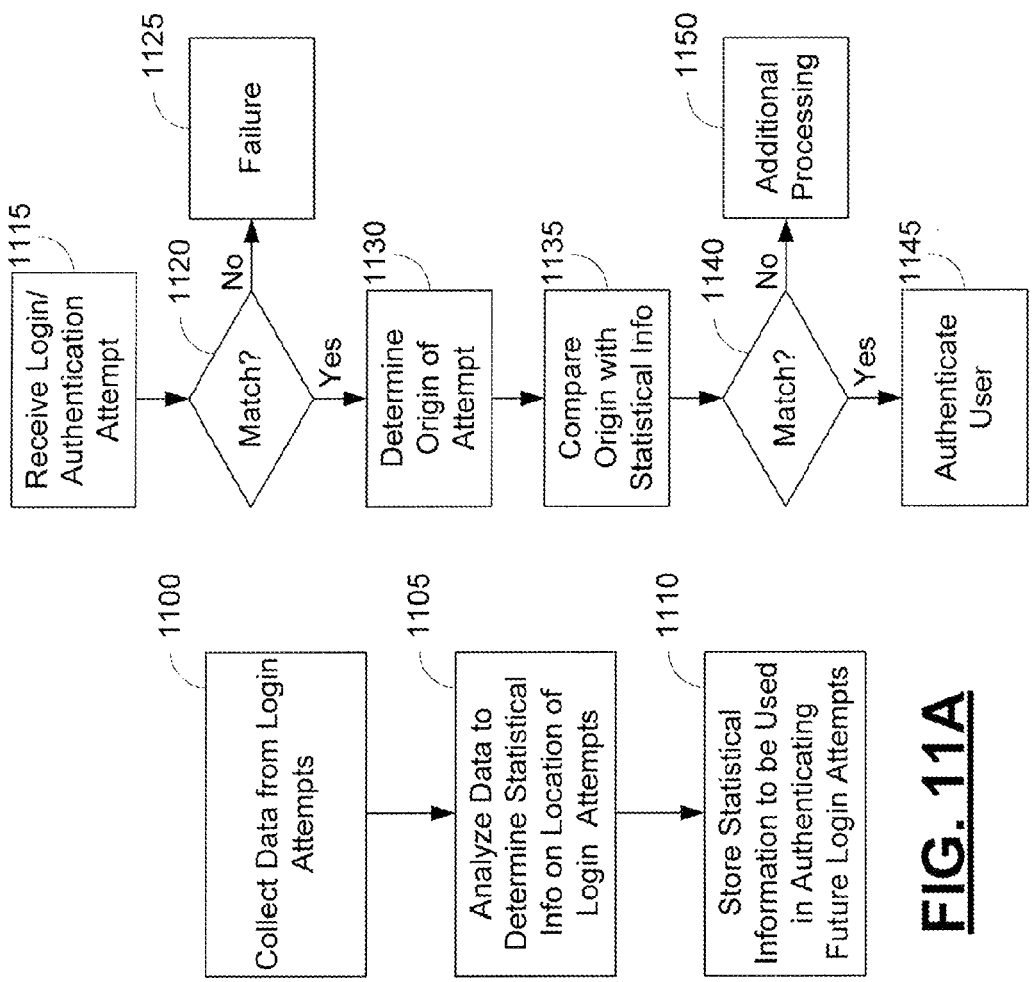
FIG. 11A
FIG. 11B
FIG. 11C

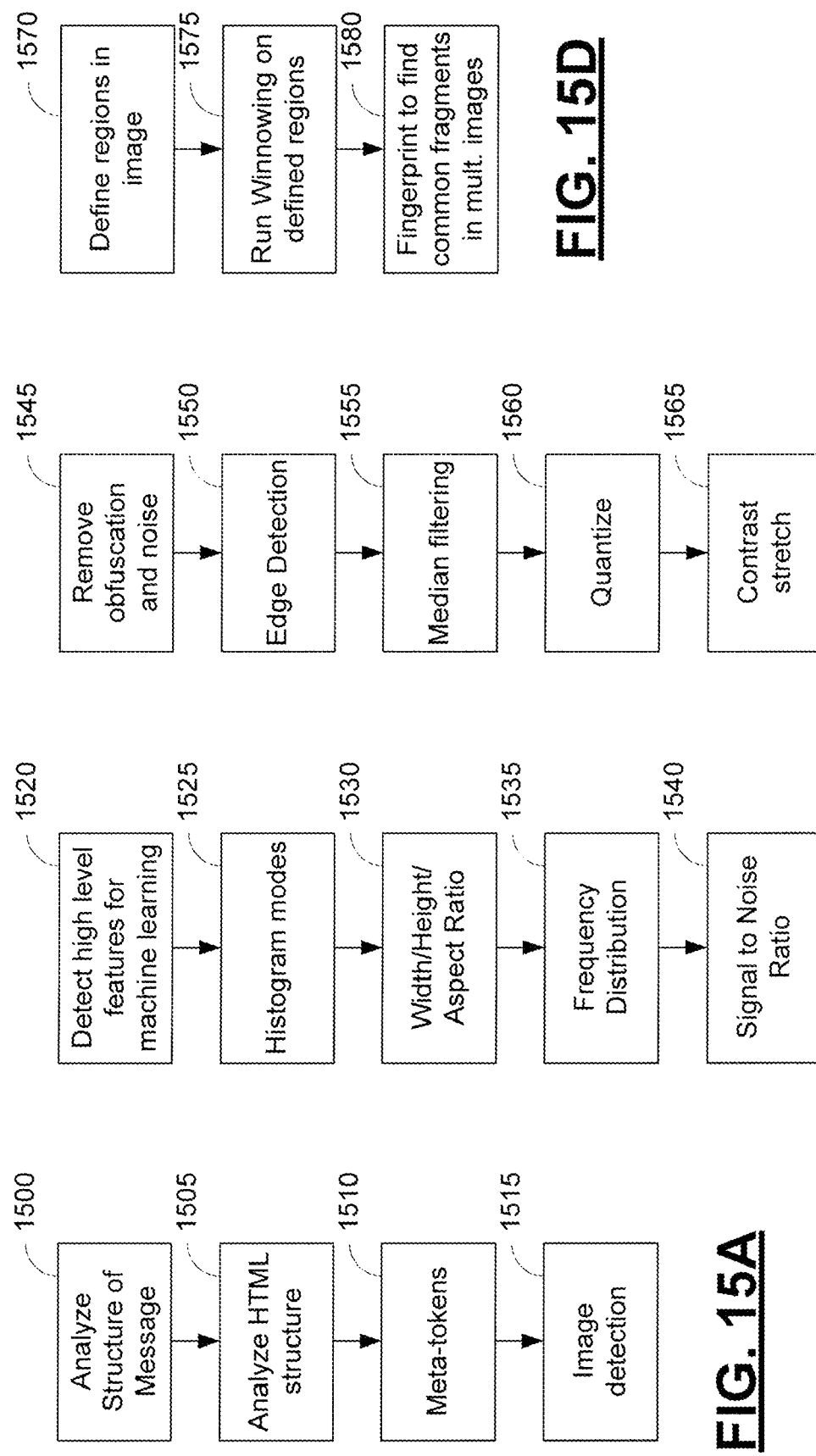

DETECTING IMAGE SPAM

CROSS-REFERENCE

This application incorporates by reference, in their entirety and for all purposes, commonly assigned U.S. patent applications:

| application Ser. No. | Title | Filing Date |
|---|---|---|
| 10/094,211 | "Systems and Methods for Enhancing Electronic Communication Security" | Mar. 8, 2002 |
| 10/361,7067 | "Systems and Methods for Automated Whitelisting in Monitored Communications" | Feb. 7, 2003 |
| 10/373,325 | "Systems and Methods for Upstream Threat Pushback" | Feb. 24, 2003 |
| 10/384,924 | "Systems and Methods for Secure Communication Delivery" | Mar. 6, 2003 |
| 11/173,941 | "Message Profiling Systems and Methods" | Jun. 2, 2005 |
| 11/142,943 | "Systems and Methods for Classification of Messaging Entities" | Jun. 2, 2005 |
| 11/338,575 | "Systems and Methods for Message Threat Management" | Mar. 24, 2006 |
| 11/456,803 | "Systems And Methods For Adaptive Message Interrogation Through Multiple Queues" | Jul. 11, 2006 |
| 11/456,765 | "Systems and Methods For Anomaly Detection in Patterns of Monitored Communications" | Jul. 11, 2006 |
| 11/423,313 | "Systems and Methods for Identifying Potentially Malicious Messages" | Jun. 9, 2006 |
| 11/456,954 | "Systems and Methods For Message Threat Management" | Jul. 12, 2006 |
| 11/456,960 | "Systems and Methods For Message Threat Management" | Jul. 12, 2006 |
| 11/423,308 | "Systems and Methods for Graphically Displaying Messaging Traffic" | Jun. 9, 2006 |
| 11/383,347 | "Content-Based Policy Compliance Systems and Methods" | May. 15, 2006 |
| 11/423,329 | "Methods and Systems for Exposing Messaging Reputation to an End User" | Jun. 9, 2006 |

This application incorporates by reference, in their entirety and for all purposes, commonly assigned U.S. patents:

| Pat. No. | Title | Filing Date |
|---|---|---|
| 6,941,467 | "Systems and Methods for Adaptive Message Interrogation through Multiple Queues" | Mar. 8, 2002 |
| 7,089,590 | "Systems and Methods for Adaptive Message Interrogation through Multiple Queues" | Sep. 2, 2005 |
| 7,096,498 | "Systems and Methods for Message Threat Management" | Feb. 7, 2003 |
| 7,124,438 | "Systems and Methods for Anomaly Detection in Patterns of Monitored Communications" | Mar. 8, 2002 |

TECHNICAL FIELD

This document relates generally to systems and methods for processing communications and more particularly to systems and methods for classifying entities associated with communications.

BACKGROUND

In the anti-spam industry, spammers use various creative means for evading detection by spam filters. As such, the entity from which a communication originated can provide another indication of whether a given communication should be allowed into an enterprise network environment.

However, current tools for message sender analysis include internet protocol (IP) blacklists (sometimes called real-time blacklists (RBLs)) and IP whitelists (real-time whitelists (RWLs)). Whitelists and blacklists certainly add value to the spam classification process; however, whitelists and blacklists are inherently limited to providing a binary-type (YES/NO) response to each query. Moreover, blacklists and whitelists treat entities independently, and overlook the evidence provided by various attributes associated with the entities.

SUMMARY

Systems and methods used to detect image spam are provided. Systems used to detect image spam can include a communications interface, a detector, an analyzer, and a communications control engine. The communications interface can receive a communication via a network. The detector can determine whether the communication comprises an image. The analyzer can analyze content associated with the image and to determine whether the image contains unwanted content. The communications control engine can determine an action to perform with respect to the communication based upon the results of the analyzer.

Methods of detecting image spam can include: receiving an incoming communication; determining whether the communication contains one or more images; analyzing the content of the one or more images to determine whether the incoming communication comprises an unwanted communication; and, performing an action on the communication based upon the result of analyzing the communication.

DESCRIPTION OF DRAWINGS

FIG. 11A is a flowchart illustrating an example operational scenario for geolocation based authentication.

FIG. 11B is a flowchart illustrating another example operational scenario for geolocation based authentication.

FIG. 11C is a flowchart illustrating another example operational scenario for geolocation based authentication.

FIG. 15A is a flowchart illustrating an operational scenario for analyzing the structure of a communication.

FIG. 15B is a flowchart illustrating an operational scenario for analyzing the features of an image.

FIG. 15C is a flowchart illustrating an operational scenario for normalizing the an image for spam processing.

FIG. 15D is a flowchart illustrating an operational scenario for analyzing the fingerprint of an image to find common fragments among multiple images.

DETAILED DESCRIPTION

Figure 1:
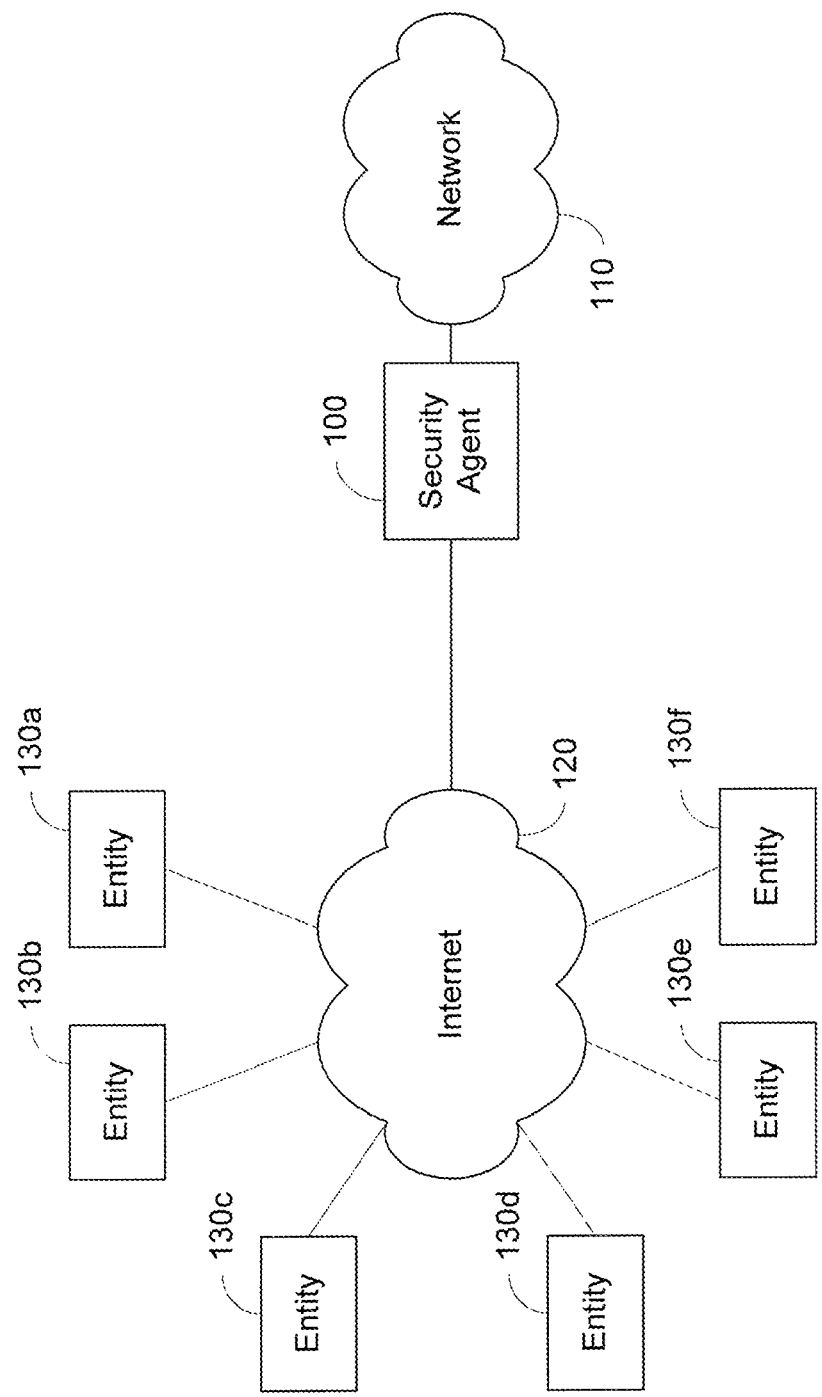
FIG. 1 is a block diagram depicting an example network in which systems and methods of this disclosure can operate.

FIG. 1 is a block diagram depicting an example network environment in which systems and methods of this disclosure can operate. Security agent 100 can typically reside between a firewall system (not shown) and servers (not shown) internal to a network 110 (e.g., an enterprise network). As should be understood, the network 110 can include a number of servers, including, for example, electronic mail servers, web servers, and various application servers as may be used by the enterprise associated with the network 110.

The security agent 100 monitors communications entering and exiting the network 110. These communications are typically received through the internet 120 from many entities 130a-f that are connected to the internet 120. One or more of the entities 130a-f can be legitimate originators of communications traffic. However, one or more of the entities 130a-f can also be non-reputable entities originating unwanted communications. As such, the security agent 100 includes a reputation engine. The reputation engine can inspect a communication and to determine a reputation associated with an entity that originated the communication. The security agent 100 then performs an action on the communication based upon the reputation of the originating entity. If the reputation indicates that the originator of the communication is reputable, for example, the security agent can forward the communication to the recipient of the communication. However, if the reputation indicates that the originator of the communication is non-reputable, for example, the security agent can quarantine the communication, perform more tests on the message, or require authentication from the message originator, among many others. Reputation engines are described in detail in United States Patent Publication No. 2006/0015942, which is hereby incorporated by reference.

Figure 2:
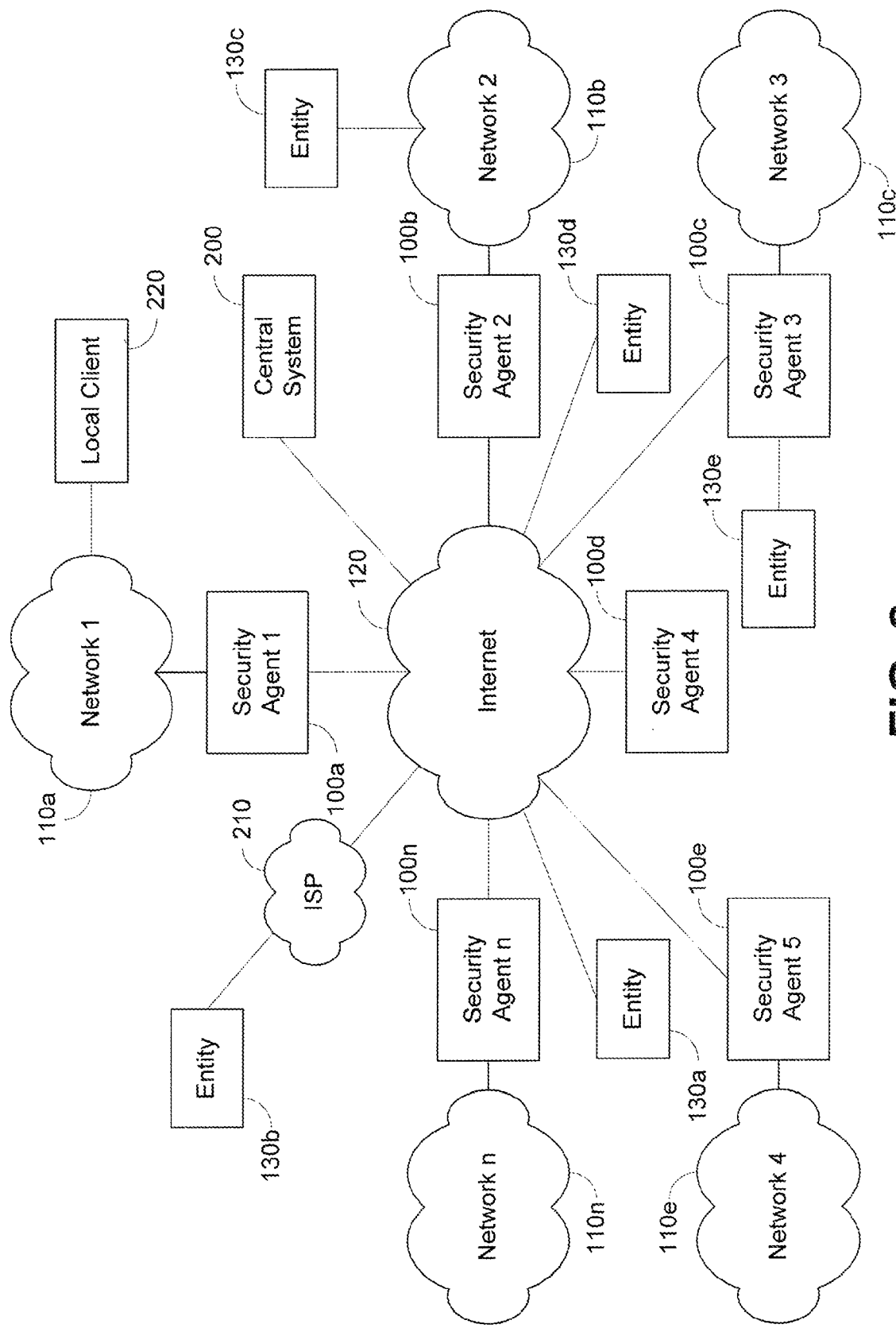
FIG. 2 is a block diagram depicting an example network architecture of this disclosure.

FIG. 2 is a block diagram depicting an example network architecture of this disclosure. Security agents 100a-n are shown logically residing between networks 110a-n, respectively, and the internet 120. While not shown in FIG. 2, it should be understood that a firewall may be installed between the security agents 100a-n and the internet 120 to provide protection from unauthorized communications from entering the respective networks 110a-n. Moreover, intrusion detection systems (IDS) (not shown) can be deployed in conjunction with firewall systems to identify suspicious patterns of activity and to signal alerts when such activity is identified.

While such systems provide some protection for a network they typically do not address application level security threats. For example, hackers often attempt to use various network-type applications (e.g., e-mail, web, instant messaging (IM), etc.) to create a pre-textual connection with the networks 110a-n in order to exploit security holes created by these various applications using entities 130a-e. However, not all entities 130a-e imply threats to the network 110a-n. Some entities 130a-e originate legitimate traffic, allowing the employees of a company to communicate with business associates more efficiently. While examining the communications for potential threats is useful it can be difficult to maintain current threat information because attacks are being continually modified to account for the latest filtering techniques. Thus, security agents 100a-n can run multiple tests on a communication to determine whether the communication is legitimate.

Furthermore, sender information included in the communication can be used to help determine whether or not a communication is legitimate. As such, sophisticated security agents 100a-n can track entities and analyze the characteristics of the entities to help determine whether to allow a communication to enter a network 110a-n. The entities 110a-n can then be assigned a reputation. Decisions on a communication can take into account the reputation of an entity 130a-e that originated the communication. Moreover, one or more central systems 200 can collect information on entities 120a-e and distribute the collected data to other central systems 200 and/or the security agents 100a-n.

Reputation engines can assist in identifying the bulk of the malicious communications without extensive and potentially costly local analysis of the content of the communication. Reputation engines can also help to identify legitimate communications and prioritize their delivery and reduce the risk of misclassifying a legitimate communication. Moreover, reputation engines can provide a dynamic and predictive approaches to the problem of identifying malicious, as well as legitimate, transactions in physical or virtual worlds. Examples include the process of filtering malicious communications in an email, instant messaging, VoIP, SMS or other communication protocol system using analysis of the reputation of sender and content. A security agent 100a-n can then apply a global or local policy to determine what action to perform with respect to the communication (such as deny, quarantine, load balance, deliver with assigned priority, analyze locally with additional scrutiny) to the reputation result.

However, the entities 130a-e can connect to the internet in a variety of methods. As should be understood, an entity 130a-e can have multiple identifiers (such as, for example, e-mail addresses, IP addresses, identifier documentation, etc)

at the same time or over a period of time. For example, a mail server with changing IP addresses can have multiple identities over time. Moreover, one identifier can be associated with multiple entities, such as, for example, when an IP address is shared by an organization with many users behind it. Moreover, the specific method used to connect to the internet can obscure the identification of the entity 130*a-e*. For example, an entity 130*b* may connect to the internet using an internet service provider (ISP) 200. Many ISPs 200 use dynamic host configuration protocol (DHCP) to assign IP addresses dynamically to entities 130*b* requesting a connection. Entities 130*a-e* can also disguise their identity by spoofing a legitimate entity. Thus, collecting data on the characteristics of each entity 130*a-e* can help to categorize an entity 130*a-e* and determine how to handle a communication.

The ease of creation and spoofing of identities in both virtual and physical world can create an incentive for users to act maliciously without bearing the consequences of that act. For example, a stolen IP address on the Internet (or a stolen passport in the physical world) of a legitimate entity by a criminal can enable that criminal to participate in malicious activity with relative ease by assuming the stolen identity. However, by assigning a reputation to the physical and virtual entities and recognizing the multiple identities that they can employ, reputation systems can influence reputable and non-reputable entities to operate responsibly for fear of becoming non-reputable, and being unable to correspond or interact with other network entities.

Figure 3:
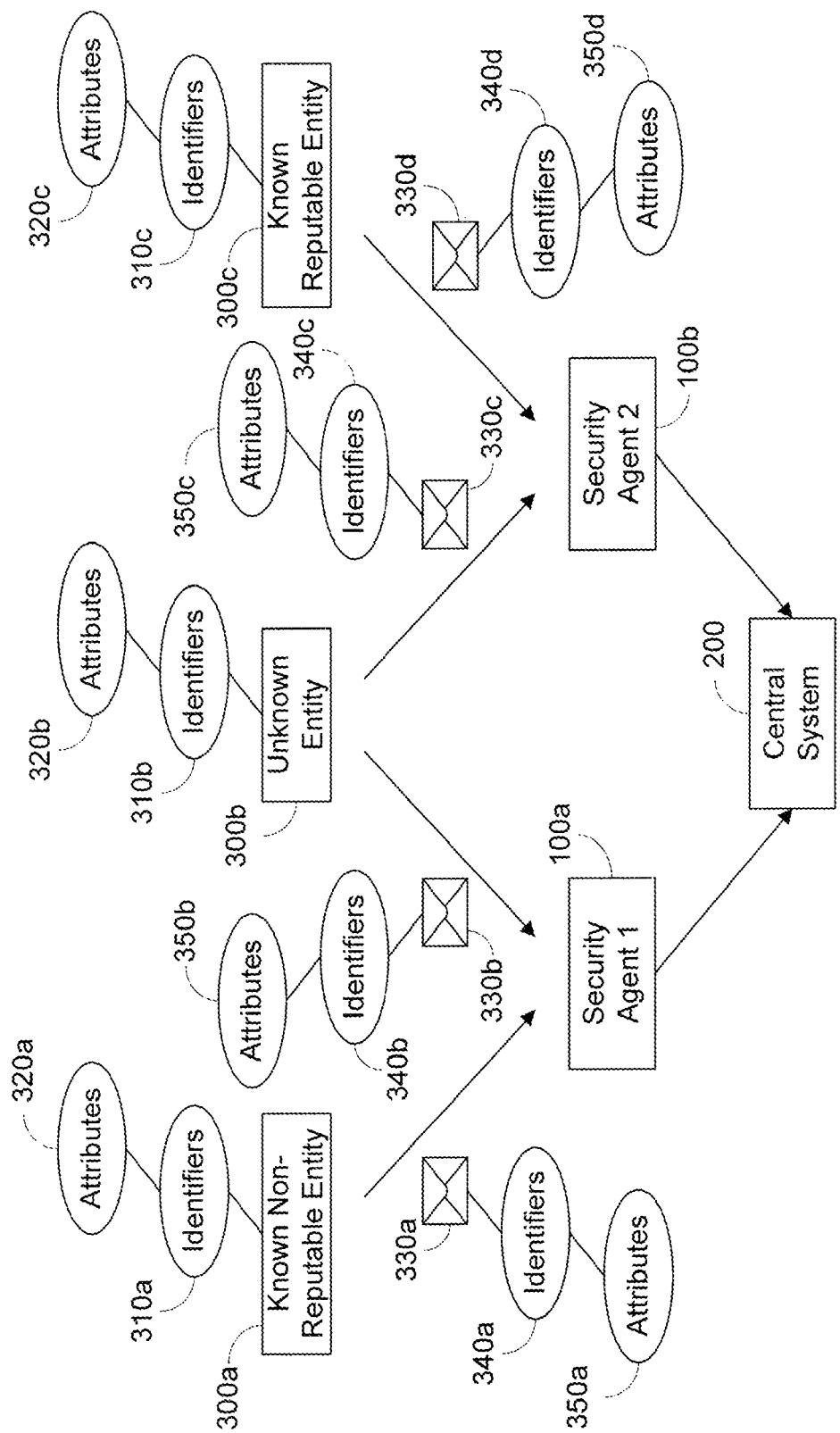
FIG. 3 is a block diagram depicting an example of communications and entities including identifiers and attributes used to detect relationships between entities.

FIG. 3 is a block diagram depicting an example of communications and entities including using identifiers and attributes used to detect relationships between entities. Security agents 100*a-b* can collect data by examining communications that are directed to an associated network. Security agents 100*a-b* can also collect data by examining communications that are relayed by an associated network. Examination and analysis of communications can allow the security agents 100*a-b* to collect information about the entities 300*a-c* sending and receiving messages, including transmission patterns, volume, or whether the entity has a tendency to send certain kinds of message (e.g., legitimate messages, spam, virus, bulk mail, etc.), among many others.

As shown in FIG. 3, each of the entities 300*a-c* is associated with one or more identifiers 310*a-c*, respectively. The identifiers 310*a-c* can include, for example, IP addresses, universal resource locator (URL), phone number, IM username, message content, domain, or any other identifier that might describe an entity. Moreover, the identifiers 310*a-c* are associated with one or more attributes 320*a-c*. As should be understood, the attributes 320*a-c* are fitted to the particular identifier 310*a-c* that is being described. For example, a message content identifier could include attributes such as, for example, malware, volume, type of content, behavior, etc. Similarly, attributes 320*a-c* associated with an identifier, such as IP address, could include one or more IP addresses associated with an entity 300*a-c*.

Furthermore, it should be understood that this data can be collected from communications 330*a-c* (e.g., e-mail) typically include some identifiers and attributes of the entity that originated the communication. Thus, the communications 330*a-c* provide a transport for communicating information about the entity to the security agents 100*a*, 100*b*. These attributes can be detected by the security agents 100*a*, 100*b* through examination of the header information included in the message, analysis of the content of the message, as well as through aggregation of information previously collected by the security agents 100*a*, 100*b* (e.g., totaling the volume of communications received from an entity).

The data from multiple security agents 100*a*, 100*b* can be aggregated and mined. For example, the data can be aggregated and mined by a central system which receives identifiers and attributes associated with all entities 300*a-c* for which the security agents 100*a*, 100*b* have received communications. Alternatively, the security agents 100*a*, 100*b* can operate as a distributed system, communicating identifier and attribute information about entities 300*a-c* with each other. The process of mining the data can correlate the attributes of entities 300*a-c* with each other, thereby determining relationships between entities 300*a-c* (such as, for example, correlations between an event occurrence, volume, and/or other determining factors).

These relationships can then be used to establish a multi-dimensional reputation "vector" for all identifiers based on the correlation of attributes that have been associated with each identifier. For example, if a non-reputable entity 300*a* with a known reputation for being non-reputable sends a message 330*a* with a first set of attributes 350*a*, and then an unknown entity 300*b* sends a message 330*b* with a second set of attributes 350*b*, the security agent 100*a* can determine whether all or a portion of the first set of attributes 350*a* matched all or a portion of the second set of attributes 350*b*. When some portion of the first set of attributes 350*a* matches some portion of the second set of attributes 330*b*, a relationship can be created depending upon the particular identifier 320*a*, 320*b* that included the matching attributes 330*a*, 330*b*. The particular identifiers 340*a*, 340*b* which are found to have matching attributes can be used to determine a strength associated with the relationship between the entities 300*a*, 300*b*. The strength of the relationship can help to determine how much of the non-reputable qualities of the non-reputable entity 300*a* are attributed to the reputation of the unknown entity 300*b*.

However, it should also be recognized that the unknown entity 300*b* may originate a communication 330*c* which includes attributes 350*c* that match some attributes 350*d* of a communication 330*d* originating from a known reputable entity 300*c*. The particular identifiers 340*c*, 340*d* which are found to have matching attributes can be used to determine a strength associated with the relationship between the entities 300*b*, 300*c*. The strength of the relationship can help to determine how much of the reputable qualities of reputable entity 300*c* are attributed to the reputation of the unknown entity 300*b*.

A distributed reputation engine also allows for real-time collaborative sharing of global intelligence about the latest threat landscape, providing instant protection benefits to the local analysis that can be performed by a filtering or risk analysis system, as well as identify malicious sources of potential new threats before they even occur. Using sensors positioned at many different geographical locations information about new threats can be quickly and shared with the central system 200, or with the distributed security agents 100*a*, 100*b*. As should be understood, such distributed sensors can include the local security agents 100*a*, 100*b*, as well as local reputation clients, traffic monitors, or any other device suitable for collecting communication data (e.g., switches, routers, servers, etc.).

For example, security agents 100*a*, 100*b* can communicate with a central system 200 to provide sharing of threat and reputation information. Alternatively, the security agents 100*a*, 100*b* can communicate threat and reputation information between each other to provide up to date and accurate threat information. In the example of FIG. 3, the first security agent 100*a* has information about the relationship between the unknown entity 300*b* and the non-reputable entity 300*a*, while the second security agent 100*b* has information about the relationship between the unknown entity 300*b* and the reputable entity 300*c*. Without sharing the information, the first security agent 100*a* may take a particular action on the communication based upon the detected relationship. However, with the knowledge of the relationship between the unknown entity 300*b* and the reputable entity 300*c*, the first security agent 100*a* might take a different action with a received communication from the unknown entity 300*b*. Sharing of the relationship information between security agents, thus provides for a more complete set of relationship information upon which a determination will be made.

The system attempts to assign reputations (reflecting a general disposition and/or categorization) to physical entities, such as individuals or automated systems performing transactions. In the virtual world, entities are represented by identifiers (ex. IPs, URLs, content) that are tied to those entities in the specific transactions (such as sending a message or transferring money out of a bank account) that the entities are performing. Reputation can thus be assigned to those identifiers based on their overall behavioral and historical patterns as well as their relationship to other identifiers, such as the relationship of IPs sending messages and URLs included in those messages. A "bad" reputation for a single identifier can cause the reputation of other neighboring identifiers to worsen, if there is a strong correlation between the identifiers. For example, an IP that is sending URLs which have a bad reputation will worsen its own reputation because of the reputation of the URLs. Finally, the individual identifier reputations can be aggregated into a single reputation (risk score) for the entity that is associated with those identifiers It should be noted that attributes can fall into a number of categories. For example, evidentiary attributes can represent physical, digital, or digitized physical data about an entity. This data can be attributed to a single known or unknown entity, or shared between multiple entities (forming entity relationships). Examples of evidentiary attributes relevant to messaging security include IP (internet protocol) address, known domain names, URLs, digital fingerprints or signatures used by the entity, TCP signatures, and et cetera.

As another example, behavioral attributes can represent human or machine-assigned observations about either an entity or an evidentiary attribute. Such attributes may include one, many, or all attributes from one or more behavioral profiles. For example, a behavioral attribute generically associated with a spammer may by a high volume of communications being sent from that entity.

A number of behavioral attributes for a particular type of behavior can be combined to derive a behavioral profile. A behavioral profile can contain a set of predefined behavioral attributes. The attributive properties assigned to these profiles include behavioral events relevant to defining the disposition of an entity matching the profile. Examples of behavioral profiles relevant to messaging security might include, "Spammer", "Scammer", and "Legitimate Sender". Events and/or evidentiary attributes relevant to each profile define appropriate entities to which a profile should be assigned. This may include a specific set of sending patterns, blacklist events, or specific attributes of the evidentiary data. Some examples include: Sender/Receiver Identification; Time Interval and sending patterns; Severity and disposition of payload; Message construction; Message quality; Protocols and related signatures; Communications medium It should be understood that entities sharing some or all of the same evidentiary attributes have an evidentiary relationship. Similarly, entities sharing behavioral attributes have a behavioral relationship. These relationships help form logical groups of related profiles, which can then be applied adaptively to enhance the profile or identify entities slightly more or less standard with the profiles assigned.

Figure 4:
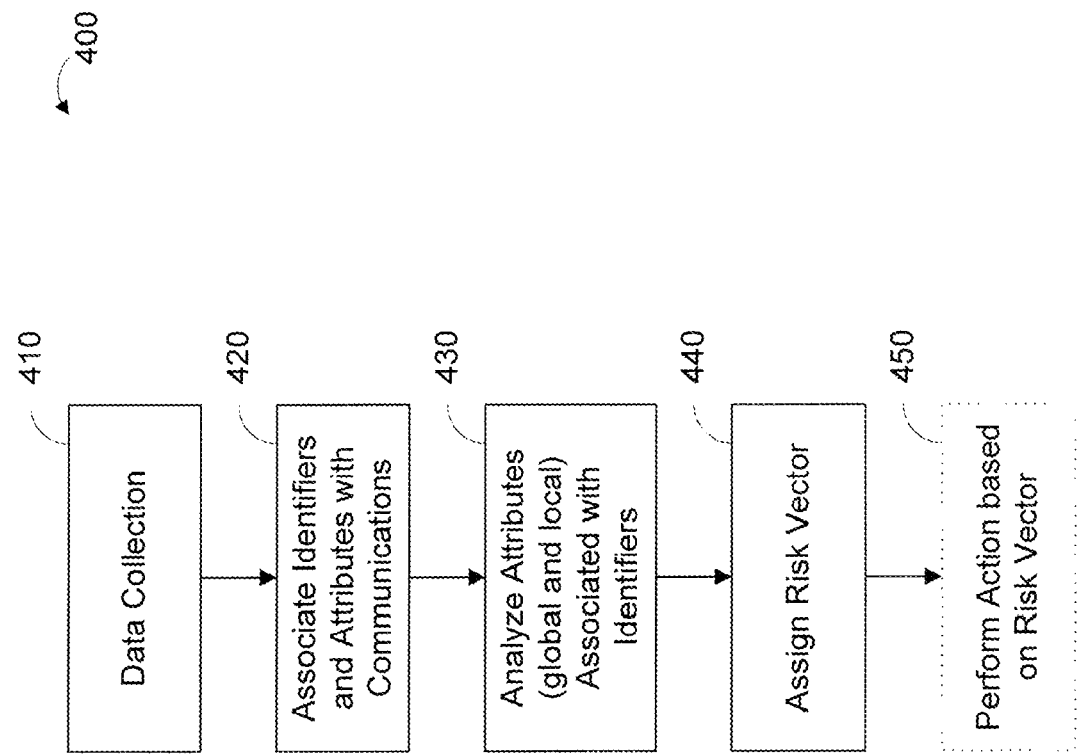
FIG. 4 is a flowchart depicting an operational scenario used to detect relationships and assign risk to entities.

FIG. 4 is a flowchart depicting an operational scenario 400 used to detect relationships and assign risk to entities. The operational scenario begins at step 410 by collecting network data. Data collection can be done, for example, by a security agent 100, a client device, a switch, a router, or any other device operable to receive communications from network entities (e.g., e-mail servers, web servers, IM servers, ISPs, file transfer protocol (FTP) servers, gopher servers, VoIP equipments, etc.).

At step 420 identifiers are associated with the collected data (e.g., communication data). Step 420 can be performed by a security agent 100 or by a central system 200 operable to aggregate data from a number of sensor devices, including, for example, one or more security agents 100. Alternatively, step 420 can be performed by the security agents 100 themselves. The identifiers can be based upon the type of communication received. For example, an e-mail can include one set of information (e.g., IP address of originator and destination, text content, attachment, etc.), while a VoIP communication can include a different set of information (e.g., originating phone number (or IP address if originating from a VoIP client), receiving phone number (or IP address if destined for a VoIP phone), voice content, etc.). Step 420 can also include assigning the attributes of the communication with the associated identifiers.

At step 430 the attributes associated with the entities are analyzed to determine whether any relationships exist between entities for which communications information has been collected. Step 430 can be performed, for example, by a central system 200 or one or more distributed security agents 100. The analysis can include comparing attributes related to different entities to find relationships between the entities. Moreover, based upon the particular attribute which serves as the basis for the relationship, a strength can be associated with the relationship.

At step 440 a risk vector is assigned to the entities. As an example, the risk vector can be assigned by the central system 200 or by one or more security agents 100. The risk vector assigned to an entity 130 (FIGS. 1-2), 300 (FIG. 3) can be based upon the relationship found between the entities and on the basis of the identifier which formed the basis for the relationship.

Figure 5:
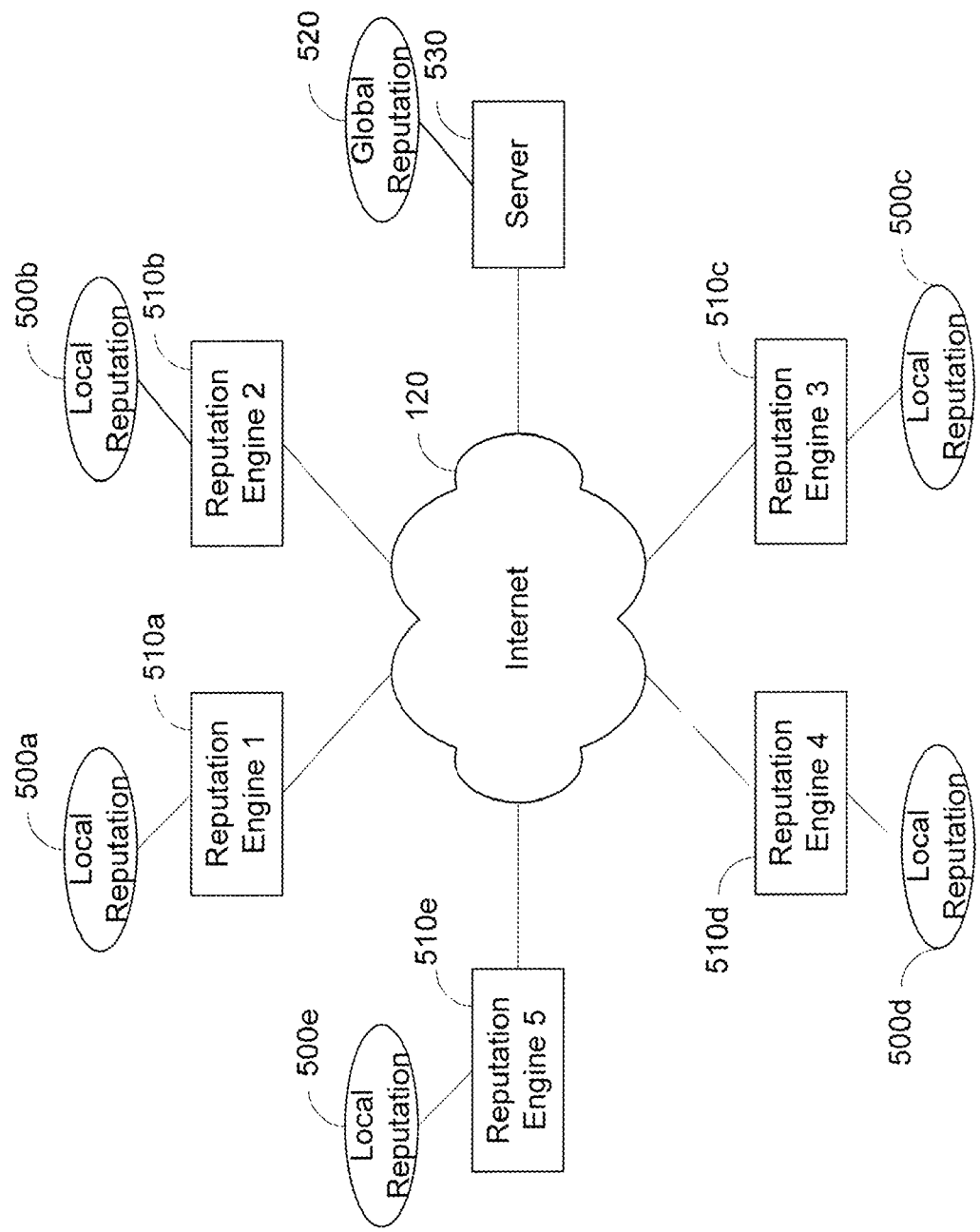
FIG. 5 is a block diagram illustrating an example network architecture including local reputations stored by local security agents and a global reputation stored by one or more servers.

At step 450, an action can be performed based upon the risk vector. The action can be performed, for example, by a security agent 100. The action can be performed on a received communication associated with an entity for which a risk vector has been assigned. The action can include any of allow, deny, quarantine, load balance, deliver with assigned priority, or analyze locally with additional scrutiny, among many others. However, it should be understood that a reputation vector can be derived separately FIG. 5 is a block diagram illustrating an example network architecture including local reputations 500*a-e* derived by local reputation engines 510*a-e* and a global reputation 520 stored by one or more servers 530. The local reputation engines 510*a-e*, for example, can be associated with local security agents such as security agents 100. Alternatively, the local reputation engines 510*a-e* can be associated, for example, with a local client. Each of the reputation engines 510*a-e* includes a list of one or more entities for which the reputation engine 510*a-e* stores a derived reputation 500*a-e*.

However, these stored derived reputations can be inconsistent between reputation engines, because each of the reputation engines may observe different types of traffic. For example, reputation engine 1 510a may include a reputation that indicates a particular entity is reputable, while reputation engine 2 510b may include a reputation that indicates that the same entity is non-reputable. These local reputational inconsistencies can be based upon different traffic received from the entity. Alternatively, the inconsistencies can be based upon the feedback from a user of local reputation engine 1 510a indicating a communication is legitimate, while a user of local reputation engine 2 510b provides feedback indicating that the same communication is not legitimate.

The server 530 receives reputation information from the local reputation engines 510a-e. However, as noted above, some of the local reputation information may be inconsistent with other local reputation information. The server 530 can arbitrate between the local reputations 500a-e to determine a global reputation 520 based upon the local reputation information 500a-e. In some examples, the global reputation information 520 can then be provided back to the local reputation engines 510a-e to provide these local engines 510a-e with up-to-date reputational information. Alternative, the local reputation engines 510a-e can be operable to query the server 530 for reputation information. In some examples, the server 530 responds to the query with global reputation information 520.

In other examples, the server 530 applies a local reputation bias to the global reputation 520. The local reputation bias can perform a transform on the global reputation to provide the local reputation engines 510a-e with a global reputation vector that is biased based upon the preferences of the particular local reputation engine 510a-e which originated the query. Thus, a local reputation engine 510a with an administrator or user(s) that has indicated a high tolerance for spam messages can receive a global reputation vector that accounts for an indicated tolerance. The particular components of the reputation vector returns to the reputation engine 510a might include portions of the reputation vector that are deemphasized with relationship to the rest of the reputation vector. Likewise, a local reputation engine 510b that has indicated, for example, a low tolerance communications from entities with reputations for originating viruses may receive a reputation vector that amplifies the components of the reputation vector that relate to virus reputation.

Figure 6:
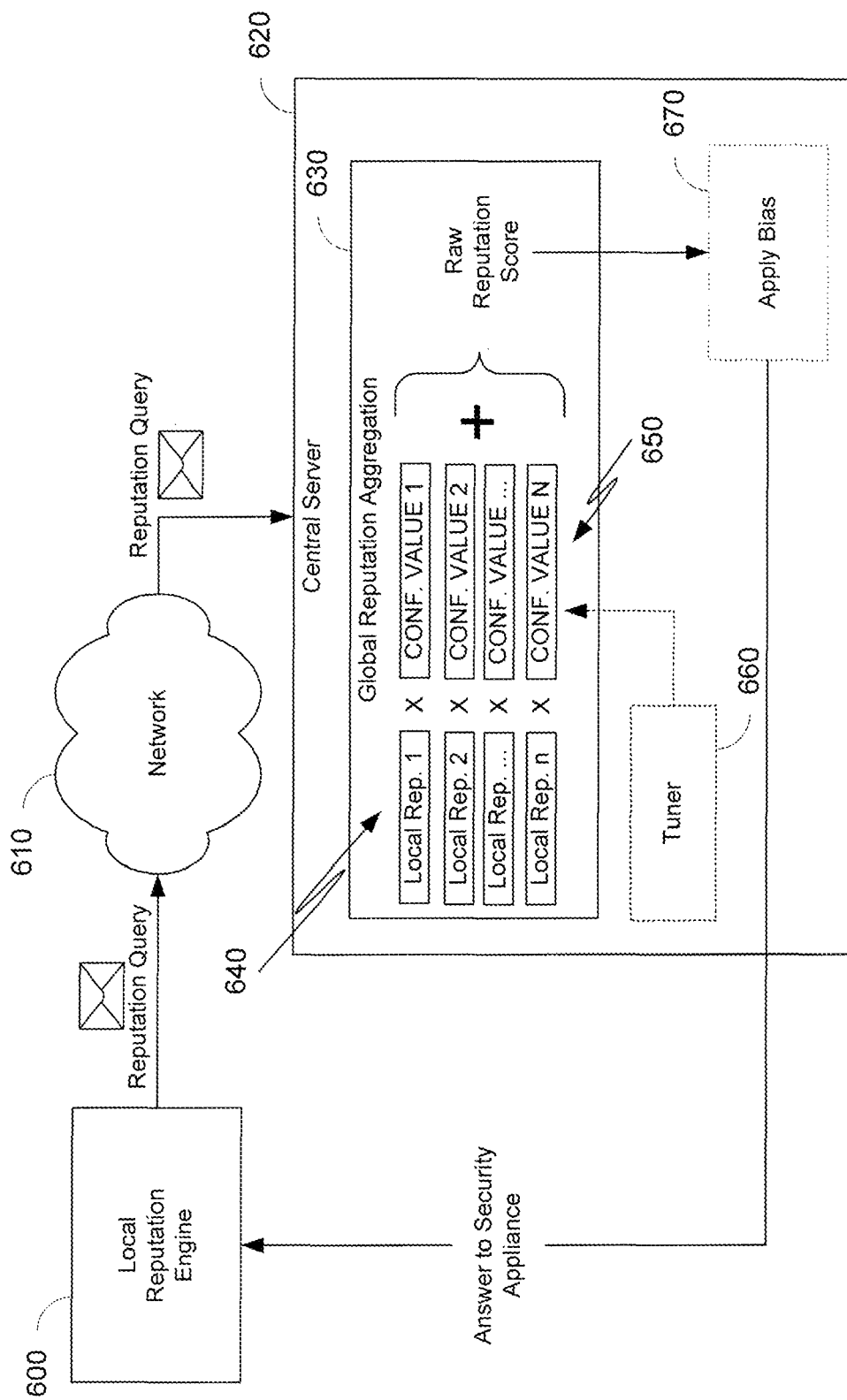
FIG. 6 is a block diagram illustrating a determination of a global reputation based on local reputation feedback.

FIG. 6 is a block diagram illustrating a determination of a global reputation based on local reputation feedback. A local reputation engine 600 is operable to send a query through a network 610 to a server 620. In some examples, the local reputation engine 600 originates a query in response to receiving a communication from an unknown entity. Alternatively, the local reputation engine 600 can originate the query responsive to receiving any communications, thereby promoting use of more up-to-date reputation information.

The server 620 is operable to respond to the query with a global reputation determination. The central server 620 can derive the global reputation using a global reputation aggregation engine 630. The global reputation aggregation engine 630 is operable to receive a plurality of local reputations 640 from a respective plurality of local reputation engines. In some examples, the plurality of local reputations 640 can be periodically sent by the reputation engines to the server 620. Alternatively, the plurality of local reputations 640 can be retrieved by the server upon receiving a query from one of the local reputation engines 600.

The local reputations can be combined using confidence values related to each of the local reputation engines and then accumulating the results. The confidence value can indicate the confidence associated with a local reputation produced by an associated reputation engine. Reputation engines associated with individuals, for example, can receive a lower weighting in the global reputation determination. In contrast, local reputations associated with reputation engines operating on large networks can receive greater weight in the global reputation determination based upon the confidence value associated with that reputation engine.

In some examples, the confidence values 650 can be based upon feedback received from users. For example, a reputation engine that receives a lot of feedback indicating that communications were not properly handled because local reputation information 640 associated with the communication indicated the wrong action can be assigned low confidence values 650 for local reputations 640 associated with those reputation engines. Similarly, reputation engines that receive feedback indicating that the communications were handled correctly based upon local reputation information 640 associated with the communication indicated the correct action can be assigned a high confidence value 650 for local reputations 640 associated with the reputation engine. Adjustment of the confidence values associated with the various reputation engines can be accomplished using a tuner 660, which is operable to receive input information and to adjust the confidence values based upon the received input. In some examples, the confidence values 650 can be provided to the server 620 by the reputation engine itself based upon stored statistics for incorrectly classified entities. In other examples, information used to weight the local reputation information can be communicated to the server 620.

In some examples, a bias 670 can be applied to the resulting global reputation vector. The bias 670 can normalize the reputation vector to provide a normalized global reputation vector to a reputation engine 600. Alternatively, the bias 670 can be applied to account for local preferences associated with the reputation engine 600 originating the reputation query. Thus, a reputation engine 600 can receive a global reputation vector matching the defined preferences of the querying reputation engine 600. The reputation engine 600 can take an action on the communication based upon the global reputation vector received from the server 620.

Figure 7:
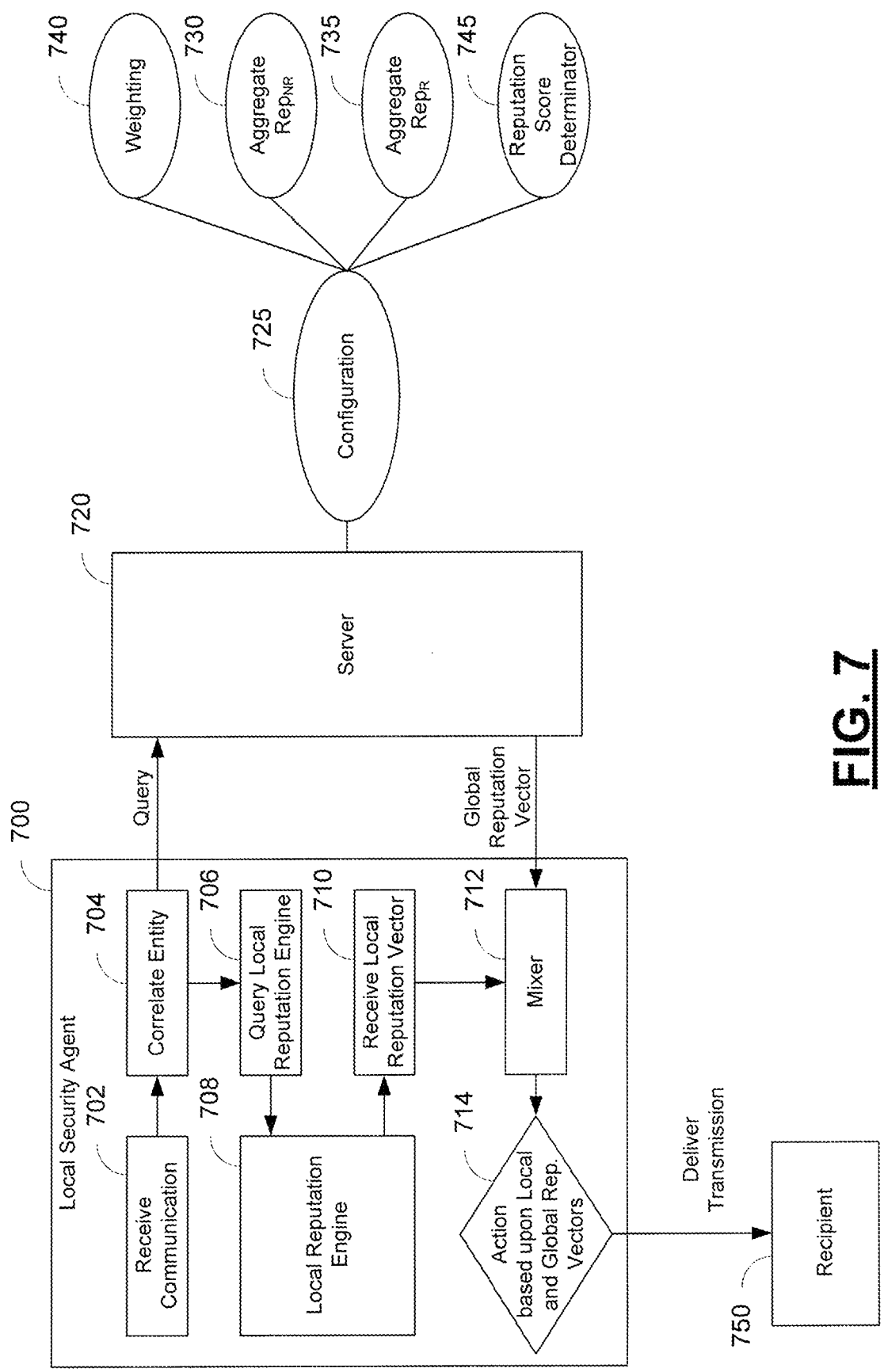
FIG. 7 is a flow diagram illustrating an example resolution between a global reputation and a local reputation.

FIG. 7 is a block diagram illustrating an example resolution between a global reputation and a local reputation. The local security agent 700 communicates with a server 720 to retrieve global reputation information from the server 720. The local security agent 700 can receive a communication at 702. The local security agent can correlate the communication to identity attributes of the message at 704. The attributes of the message can include, for example, an originating entity, a fingerprint of the message content, a message size, etc. The local security agent 700 includes this information in a query to the server 720. In other examples, the local security agent 700 can forward the entire message to the server 720, and the server can perform the correlation and analysis of the message.

The server 720 uses the information received from the query to determine a global reputation based upon a configuration 725 of the server 720. The configuration 725 can include a plurality of reputation information, including both information indicating that a queried entity is non-reputable 730 and information indicating that a queried entity is reputable 735. The configuration 725 can also apply a weighting 740 to each of the aggregated reputations 730, 735. A reputation score determinator 745 can provide the engine for weighting 740 the aggregated reputation information 730, 735 and producing a global reputation vector.

The local security agent 700 then sends a query to a local reputation engine at 706. The local reputation engine 708 performs a determination of the local reputation and returns a local reputation vector at 710. The local security agent 700 also receives a response to the reputation query sent to the server 720 in the form of a global reputation vector. The local security agent 700 then mixes the local and global reputation vectors together at 712. An action is then taken with respect to the received message at 714.

Figure 8:
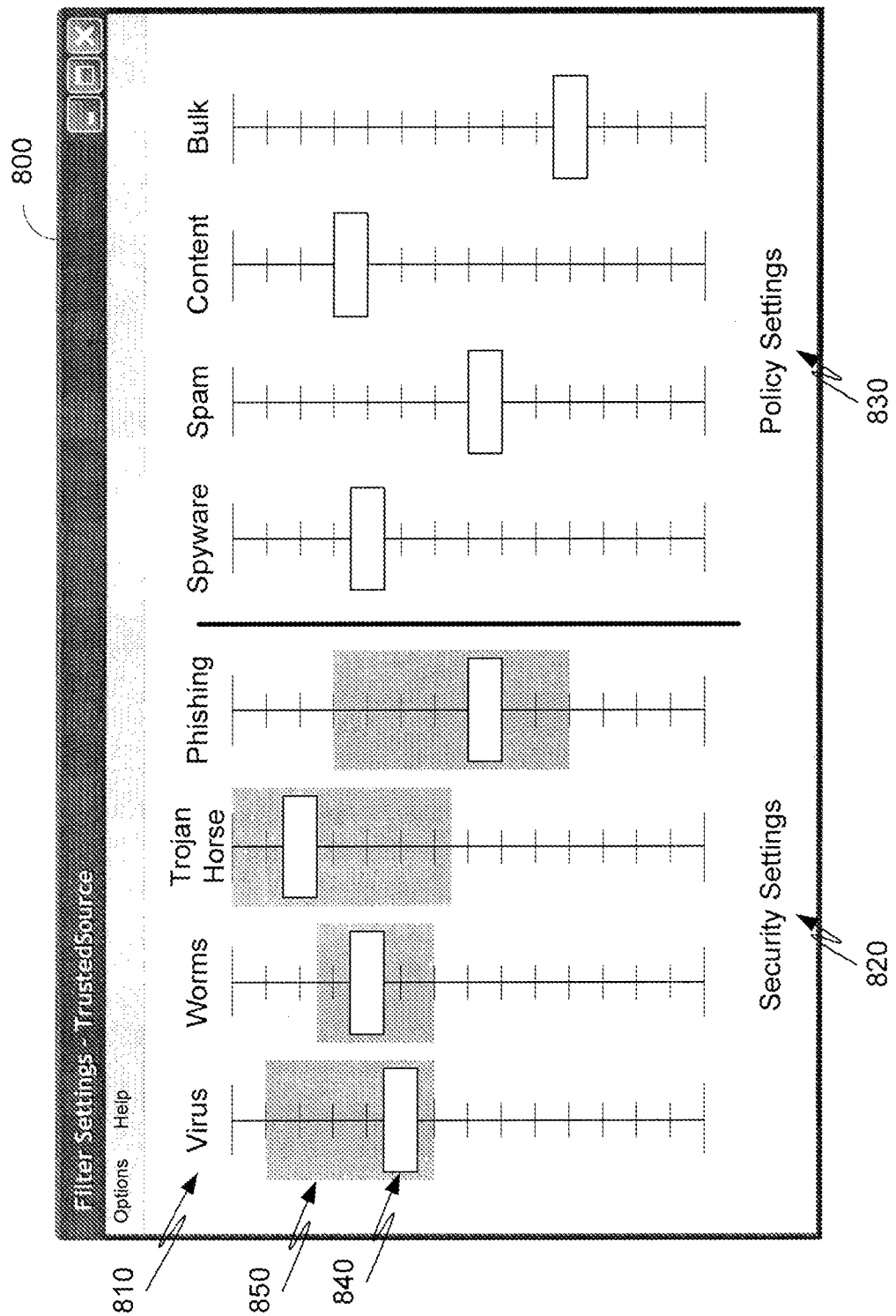
FIG. 8 is an example graphical user interface for adjusting the settings of a filter associated with a reputation server.

FIG. 8 is an example graphical user interface 800 for adjusting the settings of a filter associated with a reputation server. The graphical user interface 800 can allow the user of a local security agent to adjust the settings of a local filter in several different categories 810, such as, for example, "Virus," "Worms," "Trojan Horse," "Phishing," "Spyware," "Spam," "Content," and "Bulk." However, it should be understood that the categories 810 depicted are merely examples, and that the disclosure is not limited to the categories 810 chosen as examples here.

In some examples, the categories 810 can be divided into two or more types of categories. For example, the categories 810 of FIG. 8 are divided into a "Security Settings" type 820 of category 810, and a "Policy Settings" type 830 of category. In each of the categories 810 and types 820, 830, a mixer bar representation 840 can allow the user to adjust the particular filter setting associated with the respective category 810 of communications or entity reputations.

Moreover, while categories 810 of "Policy Settings" type 830 can be adjusted freely based upon the user's own judgment, categories of "Security Settings" type 820 can be limited to adjustment within a range. This distinction can be made in order to prevent a user from altering the security settings of the security agent beyond an acceptable range. For example, a disgruntled employee could attempt to lower the security settings, thereby leaving an enterprise network vulnerable to attack. Thus, the ranges 850 placed on categories 810 in the "Security Settings" type 820 are operable to keep security at a minimum level to prevent the network from being compromised. However, as should be noted, the "Policy Settings" type 830 categories 810 are those types of categories 810 that would not compromise the security of a network, but might only inconvenience the user or the enterprise if the settings were lowered.

Furthermore, it should be recognized that in various examples, range limits 850 can be placed upon all of the categories 810. Thus, the local security agent would prevent users from setting the mixer bar representation 840 outside of the provided range 850. It should also be noted, that in some examples, the ranges may not be shown on the graphical user interface 800. Instead, the range 850 would be abstracted out of the graphical user interface 800 and all of the settings would be relative settings. Thus, the category 810 could display and appear to allow a full range of settings, while transforming the setting into a setting within the provided range. For example, the "Virus" category 810 range 850 is provided in this example as being between level markers 8 and 13. If the graphical user interface 800 were set to abstract the allowable range 850 out of the graphical user interface 800, the "Virus" category 810 would allow setting of the mixer bar representation 840 anywhere between 0 and 14. However, the graphical user interface 800 could transform the 0-14 setting to a setting within the 8 to 13 range 850. Thus, if a user requested a setting of midway between 0 and 14, the graphical user interface could transform that setting into a setting of midway between 8 and 13.

Figure 9:
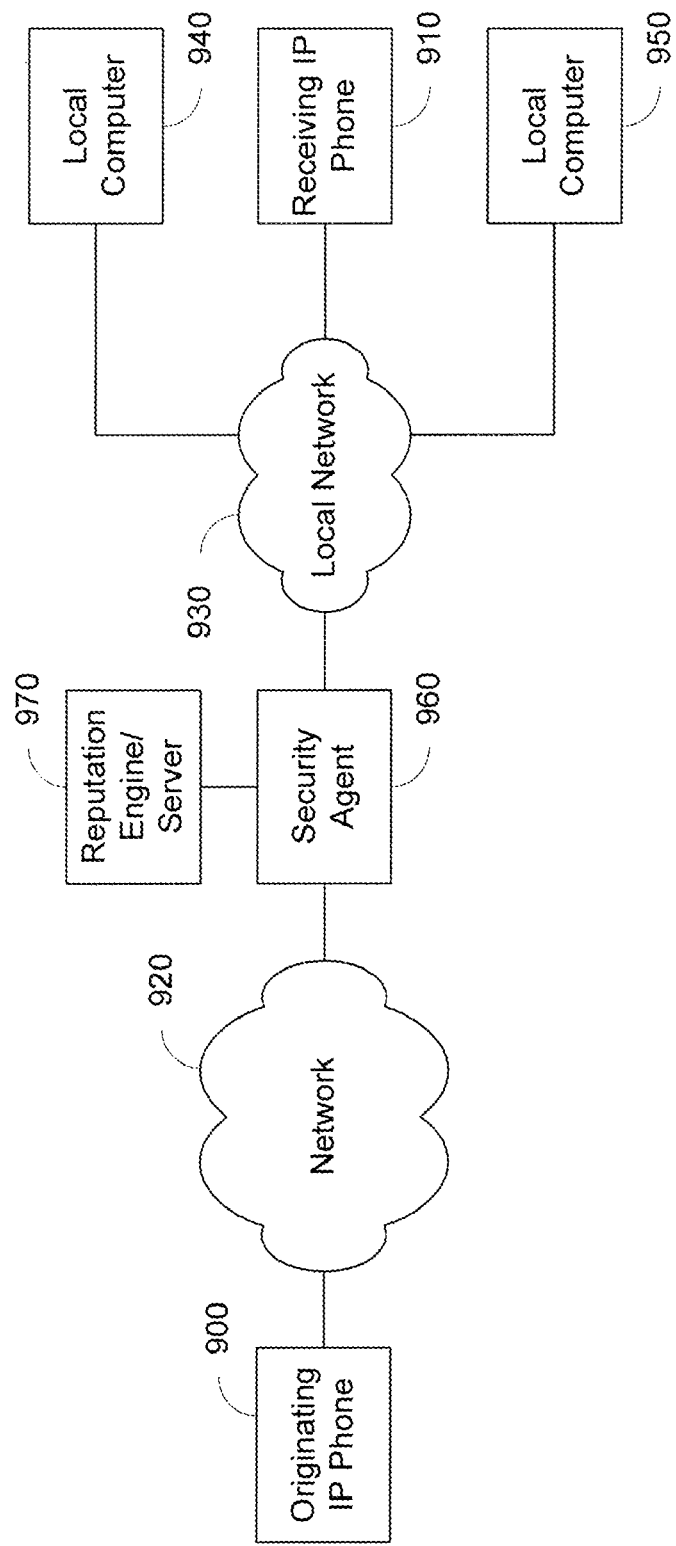
FIG. 9 is a block diagram illustrating reputation based connection throttling for voice over internet protocol (VoIP) or short message service (SMS) communications.

FIG. 9 is a block diagram illustrating reputation based connection throttling for voice over internet protocol (VoIP) or short message service (SMS) communications. As should be understood, an originating IP phone 900 can place a VoIP call to a receiving IP phone 910. These IP phones 900, 910 can be, for example, computers executing soft-phone software, network enabled phones, etc. The originating IP phone 900 can place a VoIP call through a network 920 (e.g., the internet). The receiving IP phone 910 can receive the VoIP call through a local network 930 (e.g., an enterprise network).

Upon establishing a VoIP call, the originating IP phone has established a connection to the local network 930. This connection can be exploited similarly to the way e-mail, web, instant messaging, or other internet applications can be exploited for providing unregulated connect to a network. Thus, a connection to a receiving IP phone can be exploited, thereby putting computers 940, 950 operating on the local network 930 at risk for intrusion, viruses, trojan horses, worms, and various other types of attacks based upon the established connection. Moreover, because of the time sensitive nature of VoIP communications, these communications are typically not examined to ensure that the connection is not being misused. For example voice conversations occur in real-time. If a few packets of a voice conversation are delayed, the conversation becomes stilted and difficult to understand. Thus, the contents of the packets typically cannot be examined once a connection is established.

However, a local security agent 960 can use reputation information received from a reputation engine or server 970 to determine a reputation associated with the originating IP phone. The local security agent 960 can use the reputation of the originating entity to determine whether to allow a connection to the originating entity. Thus, the security agent 960 can prevent connections to non-reputable entities, as indicated by reputations that do not comply with the policy of the local security agent 960.

In some examples, the local security agent 960 can include a connection throttling engine operable to control the flow rate of packets being transmitted using the connection established between the originating IP phone 900 and the receiving IP phone 910. Thus, an originating entities 900 with a non-reputable reputation can be allowed to make a connection to the receiving IP phone 910. However, the packet throughput will be capped, thereby preventing the originating entity 900 from exploiting the connection to attack the local network 930. Alternatively, the throttling of the connection can be accomplished by performing a detailed inspection of any packets originating from non-reputable entities. As discussed above, the detailed inspection of all VoIP packets is not efficient. Thus, quality of service (QoS) can be maximized for connections associated with reputable entities, while reducing the QoS associated with connections to non-reputable entities. Standard communication interrogation techniques can be performed on connections associated with non-reputable entities in order to discover whether any of the transmitted packets received from the originating entity comprise a threat to the network 930. Various interrogation techniques and systems are described in U.S. Pat. No. 6,941,467, No. 7,089,590, No. 7,096,498, and No. 7,124,438 and in U.S. Patent Application Nos. 2006/0015942, 2006/0015563, 2003/0172302, 2003/0172294, 2003/0172291, and 2003/0172166, which are hereby incorporated by reference.

Figure 10:
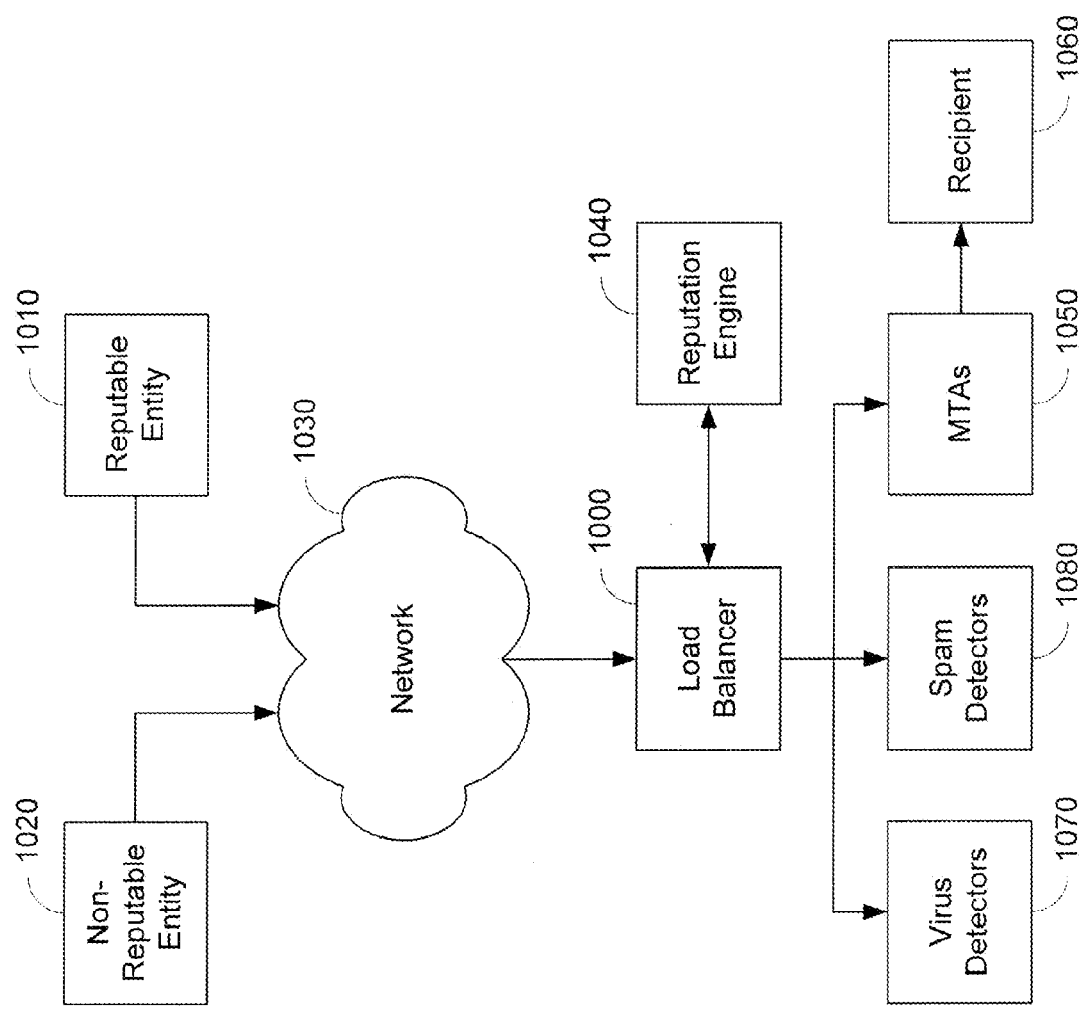
FIG. 10 is a block diagram illustrating a reputation based load balancer.

FIG. 10 is a block diagram illustrating an operation of a reputation based load balancer 1000. The load balancer 1000 is operable to receive communications from reputable and non-reputable entities 1010, 1020 (respectively) through a network 1030 (e.g., the internet). The load balancer 1000 communicates with a reputation engine 1040 to determine the reputation of entities 1010, 1020 associated with incoming or outgoing communications.

The reputation engine 1030 is operable to provide the load balancer with a reputation vector. The reputation vector can indicate the reputation of the entity 1010, 1020 associated with the communication in a variety of different categories. For example, the reputation vector might indicate a good reputation for an entity 1010, 1020 with respect to the entity 1010, 1020 originating spam, while also indicating a poor reputation for the same entity 1010, 1020 with respect to that entity 1010, 1020 originating viruses.

The load balancer 1000 can use the reputation vector to determine what action to perform with respect to a communication associated with that entity 1010, 1020. In situations where a reputable entity 1010 is associated with the communication, the message is sent to a message transfer agent (MTA) 1050 and delivered to a recipient 1060.

In situations where a non-reputable entity 1020 has a reputation for viruses, but does not have a reputation for other types of non-reputable activity, the communication is forwarded to one of a plurality of virus detectors 1070. The load balancer 1000 is operable to determine which of the plurality of virus detectors 1070 to use based upon the current capacity of the virus detectors and the reputation of the originating entity. For example, the load balancer 1000 could send the communication to the least utilized virus detector. In other examples, the load balancer 1000 might determine a degree of non-reputability associated with the originating entity and send slightly non-reputable communications to the least utilized virus detectors, while sending highly non-reputable communications to a highly utilized virus detector, thereby throttling the QoS of a connection associated with a highly non-reputable entity.

Similarly, in situations where a non-reputable entity 1020 has a reputation for originating spam communications, but no other types of non-reputable activities, the load balancer can send the communication to specialized spam detectors 1080 to the exclusion of other types of testing. It should be understood that in situations where a communication is associated with a non-reputable entity 1020 that originates multiple types of non-reputable activity, the communication can be sent to be tested for each of the types of non-reputable activity that the entity 1020 is known to display, while avoiding tests associated with non-reputable activity that the entity 1020 is not known to display.

In some examples, every communication can receive routine testing for multiple types of non-legitimate content. However, when an entity 1020 associated with the communication shows a reputation for certain types of activity, the communication can also be quarantined for detailed testing for the content that the entity shows a reputation for originating.

In yet further examples, every communication may receive the same type of testing. However, communications associated with reputable entities 1010 is sent to the testing modules with the shortest queue or to testing modules with spare processing capacity. On the other hand, communications associated with non-reputable entities 1020 is sent to testing modules 1070, 1080 with the longest queue. Therefore, communications associated with reputable entities 1010 can receive priority in delivery over communications associated with non-reputable entities. Quality of service is therefore maximized for reputable entities 1010, while being reduced for non-reputable entities 1020. Thus, reputation based load balancing can protect the network from exposure to attack by reducing the ability of a non-reputable entity to connect to the network 930.

FIG. 11A is a flowchart illustrating an example operational scenario for collection of geolocation based data for authentication analysis. At step 1100 the operational scenario collects data from various login attempts. Step 1100 can be performed for example by a local security agent, such as the security agent 100 of FIG. 1. The collected data can include IP address associated with the login attempt, time of the login attempt, number of login attempts before successful, or the details of any unsuccessful passwords attempted, among many other types of information. The collected data is then analyzed in step 1105 to derive statistical information such as, for example, a geographical location of the login attempts. Step 1105 can be performed, for example, by a reputation engine. The statistical information associated with the login attempts is then stored at step 1110. The storing can be performed, for example, by a system data store.

FIG. 11B is a flowchart illustrating an example operational scenario for geolocation based authentication. A login attempt is received at step 1115. The login attempt can be received for example, by a secure web server operable to provide secure financial data over a network. It is then determined whether the login attempt matches a stored username and password combination at step 1120. Step 1120 can be performed, for example, by a secure server operable to authenticate login attempts. If the username and password do not match a stored username/password combination, the login attempt is declared a failure at step 1125.

However, if the username and password do match a legitimate username/password combination, the origin of the login attempt is ascertained at step 1110. The origin of the login attempt can be determined by a local security agent 100 as described in FIG. 1. Alternatively, the origin of the login attempt can be determined by a reputation engine. The origin of the login attempt can then be compared with the statistical information derived in FIG. 11A, as shown in step 1135. Step 1135 can be performed, for example, by a local security agent 100 or by a reputation engine. It is determined whether the origin matches statistical expectations at step 1140. If the actual origin matches statistical expectations, the user is authenticated at step 1145.

Alternatively, if the actual origin does not match statistical expectations for the origin, further processing is performed in step 1150. It should be understood that further processing can include requesting further information from the user to verify his or her authenticity. Such information can include, for example, home address, mother's maiden name, place of birth, or any other piece of information known about the user (e.g., secret question). Other examples of additional processing can include searching previous login attempts to determine whether the location of the current login attempt is truly anomalous or merely coincidental. Furthermore, a reputation associated with the entity originating the login attempt can be derived and used to determine whether to allow the login.

FIG. 11C is a flowchart illustrating another example operational scenario for geolocation based authentication using reputation of an originating entity to confirm authentication. A login attempt is received at step 1155. The login attempt can be received for example, by a secure web server operable to provide secure financial data over a network. It is then determined whether the login attempt matches a stored username and password combination at step 1160. Step 1160 can be performed, for example, by a secure server operable to authenticate login attempts. If the username and password do not match a stored username/password combination, the login attempt is declared a failure at step 1165.

However, if the username and password do match a legitimate username/password combination, the origin of the login attempt is ascertained at step 1170. The origin of the login attempt can be determined by a local security agent 100 as described in FIG. 1. Alternatively, the origin of the login attempt can be determined by a reputation engine. A reputation associated with the entity originating the login attempt can then be retrieved, as shown in step 1175. Step 1175 can be performed, for example, by a reputation engine. It is determined whether the reputation of the originating entity is reputable at step 1180. If the originating entity is reputable, the user is authenticated at step 1185.

Alternatively, if the originating entity is non-reputable, further processing is performed in step 1190. It should be understood that further processing can include requesting further information from the user to verify his or her authenticity. Such information can include, for example, home address, mother's maiden name, place of birth, or any other piece of information known about the user (e.g., secret question). Other examples of additional processing can include searching previous login attempts to determine whether the location of the current login attempt is truly anomalous or merely coincidental.

Thus, it should be understood that reputation systems can be applied to identifying fraud in financial transactions. The reputation system can raise the risk score of a transaction depending on the reputation of the transaction originator or the data in the actual transaction (source, destination, amount, etc). In such situations, the financial institution can better determine the probability that a particular transaction is fraudulent based upon the reputation of the originating entity.

Figure 12:
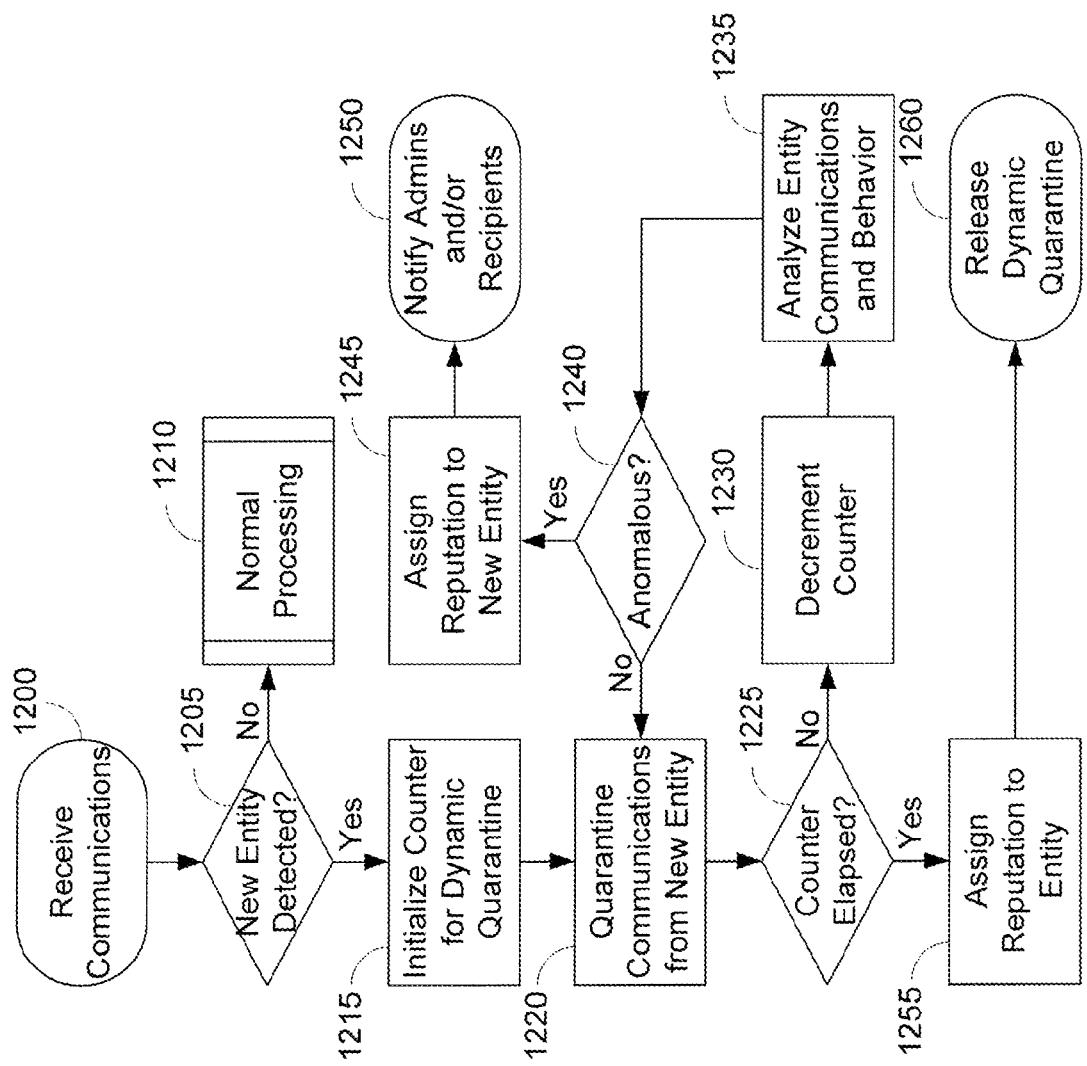
FIG. 12 is a flowchart illustrating an example operational scenario for a reputation based dynamic quarantine.

FIG. 12 is a flowchart illustrating an example operational scenario for a reputation based dynamic quarantine. Communications are received at step 1200. The communications are then analyzed to determine whether they are associated with an unknown entity at step 1205. It should be noted, however, that this operational scenario could be applied to any communications received, not merely communications received from previously unknown entities. For example, communications received from a non-reputable entity could be dynamically quarantined until it is determined that the received communications do no pose a threat to the network. Where the communications are not associated with a new entity, the communications undergo normal processing for incoming communications as shown in step 1210.

If the communications are associated with a new entity, a dynamic quarantine counter is initialized in step 1215. Communications received from the new entity are then sent to a dynamic quarantined at step 1220. The counter is then checked to determine whether the counter has elapsed in step 1225. If the counter has not elapsed, the counter is decremented in step 1230. The behavior of the entity as well as the quarantined communications can be analyzed in step 1235. A determination is made whether the quarantined communications or behavior of the entity is anomalous in step 1240. If there is no anomaly found, the operational scenario returns to step 1220, where new communications are quarantined.

However, if the communications or behavior of the entity are found to be anomalous in step 1240, a non-reputable reputation is assigned to the entity in step 1245. The process ends by sending notification to an administrator or recipients of communications sent by the originating entity.

Returning to step 1220, the process of quarantining and examining communications and entity behavior continues until anomalous behavior is discovered, or until the dynamic quarantine counter elapses in step 1225. If the dynamic quarantine counter elapses, a reputation is assigned to the entity at step 1255. Alternatively, in situations where the entity is not an unknown entity, the reputation would be updated in steps 1245 or 1255. The operational scenario ends at step 1260 by releasing the dynamic quarantine where the dynamic quarantine counter has elapsed without discovery of an anomaly in the communications or in the originating entity behavior.

Figure 13:
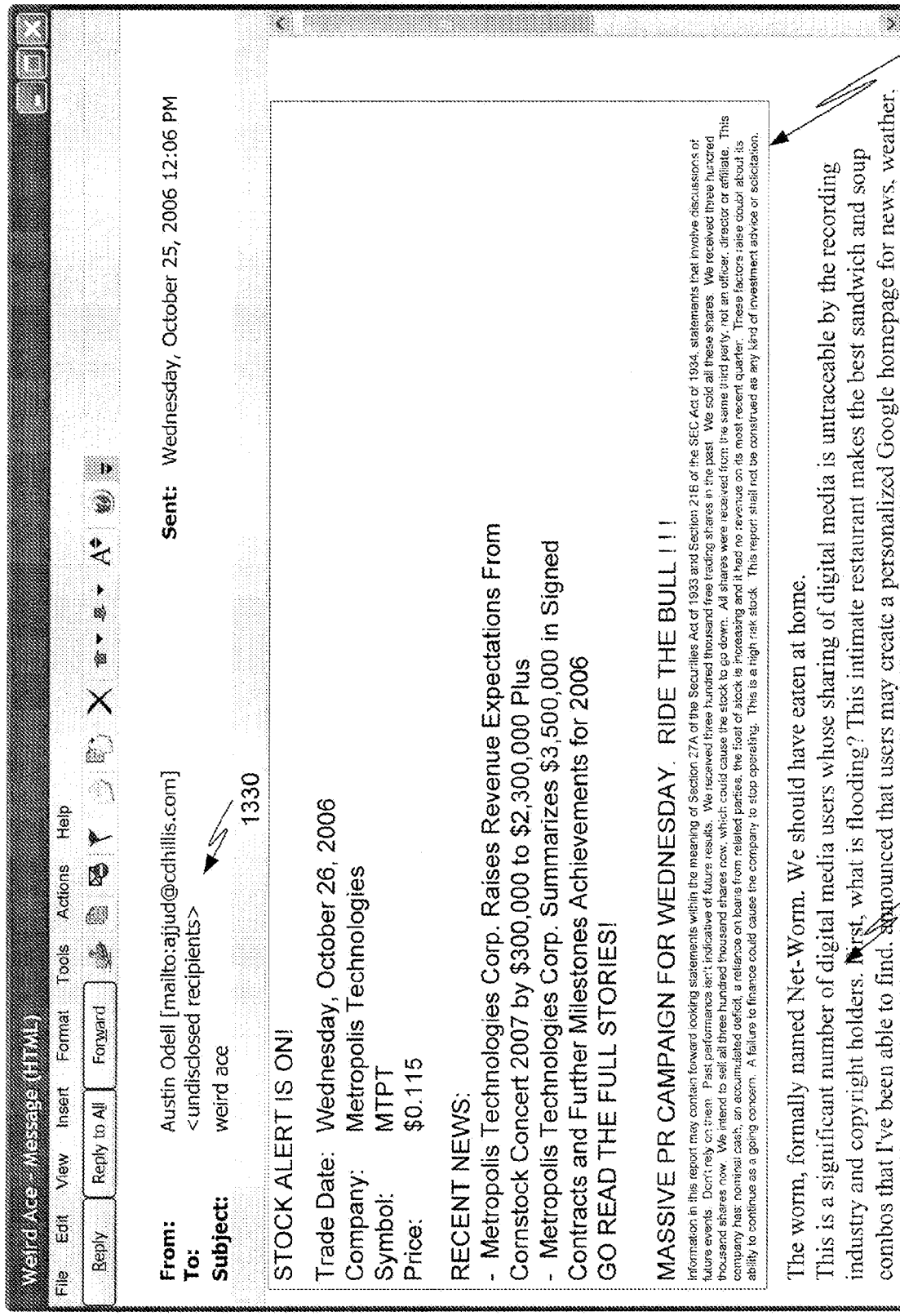
FIG. 13 is an example graphical user interface display of an image spam communication.

FIG. 13 is an example graphical user interface 1300 display of an image spam communication which can be classified as an unwanted image or message. As should be understood, image spam poses a problem for traditional spam filters. Image spam bypasses the traditional textual analysis of spam by converting the text message of the spam into an image format. FIG. 13 shows an example of image spam. The message shows an image 1310. While the image 1300 appears to be textual, it is merely the graphic encoding of a textual message. Image spam also typically includes a textual message 1320 comprising sentences which are structured correctly, but make no sense in the context of the message. The message 1320 is designed to elude spam filters that key on communications that only include an image 1310 within the communication. Moreover, the message 1320 is designed to trick filters that apply superficial testing to the text of a communication that includes an image 1310. Further, while these messages do include information about the origination of the message in the header 1330, an entity's reputation for originating image spam might not be known until the entity is caught sending image spam.

Figure 14:
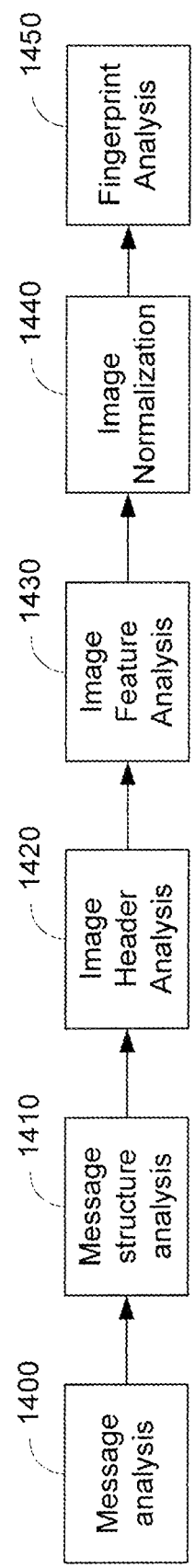
FIG. 14 is a flowchart illustrating an example operational scenario for detecting image spam.

FIG. 14 is a flowchart illustrating an example operational scenario for detecting unwanted images (e.g., image spam). It should be understood that many of the steps shown in FIG. 14 can be performed alone or in combination with any or all of the other steps shown in FIG. 14 to provide some detection of image spam. However, the use of each of the steps in FIG. 14 provides a comprehensive process for detecting image spam.

The process begins at step 1400 with analysis of the communication. Step 1400 typically includes analyzing the communication to determine whether the communication includes an image that is subject to image spam processing. At step 1410, the operational scenario performs a structural analysis of the communication to determine whether the image comprises spam. The header of the image is then analyzed in step 1420. Analysis of the image header allows the system to determine whether anomalies exist with respect to the image format itself (e.g., protocol errors, corruption, etc.). The features of the image are analyzed in step 1430. The feature analysis is intended to determine whether any of the features of the image are anomalous.

The image can be normalized in step 1440. Normalization of an image typically includes removal of random noise that might be added by a spammer to avoid image fingerprinting techniques. Image normalization is intended to convert the image into a format that can be easily compared among images. A fingerprint analysis can be performed on the normalized image to determine whether the image matches images from previously received known image spam.

FIG. 15A is a flowchart illustrating an operational scenario for analyzing the structure of a communication. The operational scenario begins at step 1500 with analysis of the message structure. At step 1505 the hypertext markup language (HTML) structure of the communication is analyzed to introduce n-gram tags as additional tokens to a Bayesian analysis. Such processing can analyze the text 1320 that is included in an image spam communication for anomalies. The HTML structure of the message can be analyzed to define meta-tokens. Meta-tokens are the HTML content of the message, processed to discard any irrelevant HTML tags and compressed by removing white space to create a "token" for Bayesian analysis. Each of the above described tokens can be used as input to a Bayesian analysis for comparison to previously received communications.

The operational scenario then includes image detection at step 1515. The image detection can include partitioning the image into a plurality of pieces and performing fingerprinting on the pieces to determine whether the fingerprints match pieces of previously received images.

FIG. 15B is a flowchart illustrating an operational scenario for analyzing the features of an image to extract features of the message for input into a clustering engine to identify components of the image which align with known image spam. The operational scenario begins at step 1520 where a number of high level features of the image are detected for use in a machine learning algorithm. Such features can include values such as the number of unique colors, number of noise black pixels, number of edges in horizontal direction (sharp transitions between shapes), etc.

One of the features extracted by the operational scenario can include the number of histogram modes of the image, as show at step 1525. The number of modes is yielded by an examination of spectral intensity of the image. As should be understood, artificial images will typically include fewer modes than natural images, because natural image colors are typically spread through a broad spectrum.

As described above, the features extracted from the image can be used to identify anomalies. In some examples, anomalies can include analyzing the characteristics of a message to determine a level of similarity of a number of features to the features of stored unwanted images. Alternatively, in some examples, the image features can also be analyzed for comparison with known reputable images to determine similarity to reputable images. It should be understood that none of the extracted features alone are determinative of a classification. For example, a specific feature might be associated with 60% of unwanted messages, while also being associated with 40% of wanted messages. Moreover, as the value associated with the feature changed, there might be a change in the probability that the message is wanted or unwanted. There are many features that can indicate a slight tendency. If each of these features are combined the image spam detection system can make classification decision.

The aspect ratio is then examined in step 1530 to determine whether there are any anomalies with respect to the image size or aspect. Such anomalies in the aspect ratio could be indicated by similarity of the image size or aspect ratio to known sizes or aspect ratios which are common to known image spam. For example, image spam can come in specific sizes to make the image spam look more like common e-mail. Messages that include images which share a common size with known spam images are more likely to be spam themselves. Alternatively, there are image sizes which are not conducive to spam (e.g., a 1"×1" square image might be difficult to read if a spammer inserted a message into the image). Messages that include images which are known to be non-conducive to spam insertion are less likely to be image spam. Thus, the aspect ratio of a message can be compared to common aspect ratios used in image spam to determine a probability that the image is an unwanted image or that the image is a reputable image.

At step 1535, the frequency distribution of the image is examined. Typically, natural pictures have uniform frequency distribution with a relative scarcity of sharp frequency gradations. On the other hand, image spam typically includes a choppy frequency distribution as a result of black letters being placed on a dark background. Thus, such non-uniform frequency distribution can indicate image spam.

At step 1540, the signal to noise ratio can be analyzed. A high signal to noise ratio might indicate that a spammer may be trying to evade fingerprinting techniques by introducing noise into the image. Increasing noise levels can thereby indicate an increasing probability that the image is an unwanted image.

It should be understood that some features can be extracted on the scale of the entire image, while other features can be extracted from subparts of the image. For example, the image can be subdivided into a plurality of subparts. Each of the rectangles can be transformed into a frequency domain using a fast Fourier transform (FFT). In the transformed image, the predominance of frequencies in a plurality of directions can be extracted as features. These subparts of the transformed image can also be examined to determine the amount of high frequencies and low frequencies. In the transformed image, the points that are further away from the origin represent higher frequencies. Similarly to the other extracted features, these features can then be compared to known legitimate and unwanted images to determine which characteristics the unknown image shares with each type of known image. Moreover, the transformed (e.g., frequency domain) image can also be divided into subparts (e.g., slices, rectangles, concentric circles, etc.) and compared against data from known images (e.g., both known unwanted images and known legitimate images).

FIG. 15C is a flowchart illustrating an operational scenario for normalizing the an image for spam processing. At step 1545, obfuscation and noise is removed from the image. As discussed previously, these can be introduced by spammers to evade fingerprinting techniques such as hashing by varying the sum of the hash such that it does not match any previously received hash fingerprints of known image spam. Obfuscation and noise removal can describe several techniques for removing artificial noise introduced by spammers. It should be understood that artificial noise can include techniques used by spammers such as banding (where a font included in the image is varied to vary the hash of the image).

An edge detection algorithm can be run on the normalized image at step 1550. In some examples, the edge detected image can be used provided to an optical character recognition engine to convert the edge detected image to text. The edge detection can be used to remove unnecessary detail from the picture which can cause inefficiency in processing the image again other images.

At step 1555, median filtering can be applied. The median filtering is applied to remove random pixel noise. Such random pixels can cause problems to content analysis of the image. The median filtering can help to remove single pixel type of noise introduced by spammers. It should be understood that single pixel noise is introduced by spammers using an image editor to alter one or more pixels in the image, which can make the image appear grainy in some areas, thereby making the image more difficult to detect.

At step 1560, the image is quantized. Quantizing of the image remove unnecessary color information. The color information typically requires more processing and is unrelated to the attempted propagation of the spam. Moreover, spammers could vary the color scheme in an image slightly and again vary the hash such that known image spam hashes would not match the derived hash from the color variant image spam.

At step 1565, contrast stretching is performed. Using contrast stretching the color scale in the image is maximized from black to white, even if the colors only vary through shades of gray. The lightest shade of the image is assigned a white value, while the darkest shade in the image is assigned a black value. All other shades are assigned their relative position in the spectrum in comparison to the lightest and darkest shades in the original image. Contrast stretching helps to define details in an image that may not make full use of the available spectrum and therefore can help to prevent spammers from using different pieces of the spectrum to avoid fingerprinting techniques. Spammers sometimes intentionally shift the intensity range of an image to defeat some types of feature identification engines. Contrast stretching can also help normalize an image such that it can be compared to other images to identify common features contained in the images.

FIG. 15D is a flowchart illustrating an operational scenario for analyzing the fingerprint of an image to find common fragments among multiple images. The operational scenario begins a step 1570 by defining regions within an image. A winnowing algorithm is then performed on the defined regions to identify the relevant portions of the image upon which fingerprints should be taken at step 1575. At step 1580, the operational scenario fingerprints the resulting fragments from the winnowing operation and determines whether there is a match between the fingerprints of the received image an known spam images. A similar winnowing fingerprint approach is described in United States Patent Application Publication No. 20061/0251068, which is hereby incorporated by reference.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method comprising:
   receiving an incoming communication associated with a particular entity;
   identifying that the communication contains one or more images;
   determining whether one or more of the images includes a graphic encoding of a textual spam message, wherein the determining includes, for each of the one or more images:
      normalizing the image to generate a normalized image, wherein the normalized image is a representation of the image with at least some noise removed from the image and the normalized image comprises overlapping sub-regions having image data;
      determining whether the image includes graphical encoding of text corresponding to text in known spam;
      determining whether aspect ratio of the image corresponds to a known aspect ratio corresponding to known spam;
      generating fingerprints of the image data from the overlapping sub-regions of the normalized image, wherein the fingerprints specify attributes of the normalized image;
      comparing the fingerprints from the normalized image with fingerprints of known spam images, wherein the comparison comprises for at least one of the fingerprints:
         determining a first measure that the at least one of the fingerprints is similar to at least one fingerprint of a known spam image;
         determining a second measure that the at least one of the fingerprints is similar to at least one fingerprint of a known non-spam image; and
      classifying the image as a spam image or a non-spam image based at least in part on the determination of whether the image includes graphical encoding of text corresponding to text in known spam, the determination of whether the aspect ratio of the image corresponds to a known aspect ratio corresponding to known spam, and the comparison of the fingerprints; and
   updating a reputation score for the particular entity based at least in part upon a result of the classification, wherein the reputation score for the particular entity is further based on a strength of relationship between the particular entity and a first entity having a reputable reputation score and the strength of relationship is based on similarities between content in messages sent by the particular entity and content of messages sent by the first entity.

2. The method of claim 1, wherein normalizing the image to generate a normalized image comprises removing features introduced by spammers to evade optical character recognition engines or signature-based detection techniques.

3. The method of claim 2, further comprising executing an optical character recognition engine on the normalized image to produce a text version of the communication.

4. The method of claim 2, wherein normalizing the image comprises removing obfuscation, noise or other irrelevant content from the image.

5. The method of claim 2, wherein normalizing the image comprises executing a median filter on the image.

6. The method of claim 2, wherein normalizing the image comprises quantizing the image to remove extraneous color information.

7. The method of claim 2, wherein normalizing the image comprises executing a contrast stretching engine on the image.

8. The method of claim 1, further comprising winnowing the resulting fingerprints to identify common sub-regions between the image and known image spam or other previously identified entities.

9. The method of claim 1, further comprising identifying high level features to be classified by machine learning engines.

10. The method of claim 9, wherein the machine learning engines uses algorithms such as a clustering technique or a support vector machine.

11. The method of claim 9, further comprising deriving histogram modes associated with the image to determine whether the image includes any anomalous histogram modes.

12. The method of claim 11, further comprising analyzing a frequency distribution of the image to determine whether the image includes an anomalous frequency distribution.

13. The method of claim 11, further comprising analyzing a signal to noise ratio of the image to determine whether the image includes an anomalous signal to noise ratio.

14. The method of claim 13, wherein any anomalies indicate that the communication comprises image spam.

15. The method of claim 1, further comprising analyzing formalities associated with the communication to determine whether any anomalies exist with respect to the communication or the content of the communication.

16. The method of claim 1, further comprising analyzing the communication to detect whether an image is mislabeled as a file type different from the actual file type of the image.

17. The method of claim 1, further comprising analyzing the communication comprises detecting images which are designed to be nonconforming to the corresponding image standard specifications to which the image purports to conform.

18. The method of claim 1, further comprising determining whether the image is legitimate by comparing the image to a set of whitelisted images.

19. The method of claim 1, further comprising analyzing the communication structure and layout to determine whether the communication appears similar to a previously identified malicious communication.

20. The method of claim 1, further comprising identifying features that may be classified by a machine learning engine.

21. The method of claim 20, further comprising executing a Bayesian classification of the communication.

22. The method of claim 1, wherein the incoming communication has a hypertext markup language structure, the method further comprising:
defining meta-tokens based on the hypertext markup language structure of the communication, wherein the meta-tokens specify hypertext markup language content of the communication including image content from the one or more images;
determining that the communication is similar to at least one other communication based on the defined meta-tokens, wherein the at least one other communication is a known unwanted communication; and
classifying the communication as an unwanted communication based on the determination that the communication is similar to the at least one other communication.

23. The method of claim 1, wherein the first measure is based at least in part on whether the at least one of the fingerprints is similar to a first number of known spam image fingerprints and the second measure is based at least in part on whether the at least one of the fingerprints is similar to a second number of known non-spam image fingerprints, each of the first and second numbers being greater than zero.

24. The method of claim 1, wherein updating the reputation score comprises updating both a global version of the reputation score for the particular entity and a local version of the reputation score for the particular entity.

25. An image spam detection system, comprising:
at least one processor;
at least one memory element;
a communications interface operable to receive a communication via a network, wherein the communication is associated with a particular entity;
a detector operable, when executed by the at least one processor, to identify whether the communication comprises an image;
an analyzer operable, when executed by the at least one processor, to, in response to the identification that the communication comprises an image, determine whether the image corresponds to a graphic encoding of a textual spam message, wherein the determining includes:
normalizing the image to generate a normalized image, wherein the normalized image is a representation of the image with at least some noise removed from the image and the normalized image comprises overlapping sub-regions having image data;
determining whether the image includes graphical encoding of text corresponding to text in known spam;
determining whether aspect ratio of the image corresponds to a known aspect ratio corresponding to known spam;
generating fingerprints of the image data from the overlapping sub-regions of the normalized image, wherein the fingerprints specify attributes of the normalized image;
comparing the fingerprints from the normalized image with fingerprints of known spam images, wherein the comparison comprises for at least one of the fingerprints:
determining a first measure that the at least one of the fingerprints is similar to at least one fingerprint of a known spam image;
determining a second measure that the at least one of the fingerprints is similar to at least one fingerprint of a known non-spam image; and
classifying the image as a spam image or a non-spam image based at least in part on the determination of whether the image includes graphical encoding of text corresponding to text in known spam, the determination of whether the aspect ratio of the image corresponds to a known aspect ratio corresponding to known spam, and the comparison of the fingerprints; and
a communications control engine operable to determine an action to perform with respect to the communication based at least in part upon results of the classification performed by the analyzer, wherein the action comprises updating a reputation score for the particular entity based at least in part upon a result of the classification, the reputation score for the particular entity is further based on a strength of relationship between the particular entity and a first entity having a reputable reputation score and the strength of relationship is based on similarities between content in messages sent by the particular entity and content of messages sent by the first entity.

26. The system of claim 25, wherein the analyzer comprises an edge detection engine operable process the image to produce an edge detected image, wherein the edge detection engine is operable to use digital signal processing to detect color gradations in the image.

27. The system of claim 25, further comprising an optical character recognition engine operable to process the normalized image to produce a text version of the communication.

28. The system of claim 25, wherein the analyzer is operable to remove obfuscation, noise, or other irrelevant content from the image.

29. The system of claim 25, wherein the analyzer is operable to execute a median filter on the image.

30. The system of claim 25, wherein the analyzer is operable to quantize the image to remove extraneous color information.

31. The system of claim 25, wherein the analyzer is operable to execute a contrast stretching engine on the image.

32. The system of claim 25, wherein any fingerprints generated by the analyzer are winnowed to identify common image sub-regions between the normalized image and known image spam or other previously identified entities.

33. The system of claim 25, wherein the analyzer identifies high level features to be classified by a machine learning engine.

34. The system of claim 33, wherein the machine learning engine comprises a clustering algorithm or a support vector machine.

35. The system of claim 33, wherein the analyzer is operable to derive one or more histogram modes associated with the image to determine whether the image includes any anomalous histogram modes.

36. The system of claim 35, wherein the analyzer is operable to analyze the frequency distribution of the image to determine whether the image includes an anomalous frequency distribution.

37. The system of claim 35, wherein the analyzer is operable to analyze a signal to noise ratio of the image to determine whether the image includes an anomalous signal to noise ratio.

38. The system of claim 37, wherein any anomalies indicate that the communication comprises image spam.

39. The system of claim 25, wherein the analyzer is operable to analyze formalities associated with the communication to determine whether any anomalies exist with respect to the communication or the content of the communication.

40. At least one machine accessible storage medium having instructions stored thereon, the instructions when executed on a machine, cause the machine to:
  identify a communication that contains one or more images and is associated with a particular entity;
  for each of the one or more images:
    normalize the image to generate a normalized image, wherein the normalized image is a representation of the image with at least some noise removed from the image and the normalized image comprises overlapping sub-regions having image data;
    determine whether the image includes graphical encoding of text corresponding to text in known spam;
    determine whether aspect ratio of the image corresponds to a known aspect ratio corresponding to known spam;
    generate fingerprints of the image data from the overlapping sub-regions of the normalized image, wherein the fingerprints specify attributes of the normalized image;
    compare the fingerprints from the normalized image with fingerprints of known spam images, wherein the comparison comprises for at least one of the fingerprints:
      determining a first measure that the at least one of the fingerprints is similar to at least one fingerprint of a known spam image;
      determining a second measure that the at least one of the fingerprints is similar to at least one fingerprint of a known non-spam image; and
    classify the image as a spam image or a non-spam image based at least in part on the determination of whether the image includes graphical encoding of text corresponding to text in known spam, the determination of whether the aspect ratio of the image corresponds to a known aspect ratio corresponding to known spam, and the comparison of the fingerprints; and
  perform an action on the communication based at least in part upon a result of the classifications, wherein the action comprises updating a reputation score for the particular entity based at least in part upon a result of the classification, wherein the reputation score for the particular entity is further based on a strength of relationship between the particular entity and a strength of relationship between the particular entity and a first entity having a reputable reputation score and the strength of relationship is based on similarities between content in messages sent by the particular entity and content of messages sent by the first entity.

* * * * *

UNITED STATES PATENT AND TRADEMARK OFFICE
CERTIFICATE OF CORRECTION

PATENT NO. : 8,763,114 B2
APPLICATION NO. : 11/626568
DATED : June 24, 2014
INVENTOR(S) : Dmitri Alperovitch et al.

It is certified that error appears in the above-identified patent and that said Letters Patent is hereby corrected as shown below:

On the Title Page

On page 7, under "OTHER PUBLICATIONS", in column 2, line 6, Delete "Joachins" and insert -- Joachims --, therefor.

On page 9, under "OTHER PUBLICATIONS", in column 1, line 42, Delete ""HITP" and insert -- "HTTP --, therefor.

On page 9, under "OTHER PUBLICATIONS", in column 1, line 63, Delete "Subspce" and insert -- Subspace --, therefor.

On page 9, under "OTHER PUBLICATIONS", in column 2, line 6, Delete "Repuratoin" and insert -- Reputation --, therefor.

On page 9, under "OTHER PUBLICATIONS", in column 2, line 6, Delete "Semtnatic" and insert -- Semantic --, therefor.

On page 9, under "OTHER PUBLICATIONS", in column 2, line 66, Delete "Purusant" and insert -- Pursuant --, therefor.

On page 10, under "OTHER PUBLICATIONS", in column 1, line 12, Delete "Rejecton" and insert -- Rejection --, therefor.

On page 10, under "OTHER PUBLICATIONS", in column 1, line 20, Delete "Actrion" and insert -- Action --, therefor.

Signed and Sealed this
Nineteenth Day of May, 2015

Michelle K. Lee
*Director of the United States Patent and Trademark Office*

CERTIFICATE OF CORRECTION (continued)
U.S. Pat. No. 8,763,114 B2

In the Specification

In column 1, line 11, Delete "10/361,7067" and insert -- 10/361,067 --, therefor.

In column 1, line 20, Delete "11/388,575" and insert -- 11/338,575 --, therefor.